United States Patent
Hu et al.

(10) Patent No.: US 12,177,855 B2
(45) Date of Patent: Dec. 24, 2024

(54) METHOD AND APPARATUS FOR TRANSMITTING DOWNLINK CONTROL INFORMATION

(71) Applicant: ZTE CORPORATION, Guangdong (CN)

(72) Inventors: Youjun Hu, Shenzhen (CN); Bo Dai, Shenzhen (CN); Huiying Fang, Shenzhen (CN); Kun Liu, Shenzhen (CN); Weiwei Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 637 days.

(21) Appl. No.: 17/245,346

(22) Filed: Apr. 30, 2021

(65) Prior Publication Data
US 2022/0369296 A1 Nov. 17, 2022

Related U.S. Application Data

(63) Continuation of application No. PCT/CN2019/114249, filed on Oct. 30, 2019.

(30) Foreign Application Priority Data

Nov. 2, 2018 (CN) .......................... 201811302529.3

(51) Int. Cl.
*H04W 72/23* (2023.01)
*H04L 1/1812* (2023.01)
*H04L 1/1829* (2023.01)

(52) U.S. Cl.
CPC ........... *H04W 72/23* (2023.01); *H04L 1/1812* (2013.01); *H04L 1/1861* (2013.01)

(58) Field of Classification Search
CPC .................................................. H04W 72/23
See application file for complete search history.

(56) References Cited

U.S. PATENT DOCUMENTS

| 2013/0121304 | A1* | 5/2013 | Nory ..................... H04L 5/0055 370/329 |
| 2016/0323854 | A1* | 11/2016 | Gao .......................... H04L 5/14 |
| 2018/0132264 | A1* | 5/2018 | Jung ..................... H04L 1/1854 |
| 2018/0176945 | A1* | 6/2018 | Cao ....................... H04L 5/0044 |

(Continued)

FOREIGN PATENT DOCUMENTS

| CN | 101841771 A | 9/2010 |
| CN | 102474465 A | 5/2012 |
| CN | 102484520 A | 5/2012 |

(Continued)

OTHER PUBLICATIONS

International Search Report and Written Opinion on PCT/CN2019/114249 mailed on Jan. 21, 2020 (11 pages).
Extended EP Search Report on EP 19877984.5 dated Apr. 19, 2022 (12 pages).
First CN Office Action on CN 201811302529.3 dated Jun. 9, 2022 (12 pages).

(Continued)

*Primary Examiner* — Jason E Mattis
(74) *Attorney, Agent, or Firm* — Foley & Lardner LLP

(57) ABSTRACT

Provided are a method and apparatus for transmitting downlink control information. The method includes transmitting the downlink control information (DCI) through a physical downlink control channel (PDCCH); and scheduling multiple transport blocks (TBs) through the DCI. The scheduled multiple TBs are indicated by new data indicator (NDI) information and hybrid automatic repeat request (HARQ) process information in the DCI.

8 Claims, 3 Drawing Sheets

(56) References Cited

U.S. PATENT DOCUMENTS

2021/0266106 A1* 8/2021 Yan ..................... H04L 1/1822
2021/0266944 A1* 8/2021 Noh .................. H04W 72/0453

FOREIGN PATENT DOCUMENTS

| CN | 102823183 A | 12/2012 |
| CN | 105790897 A | 7/2016 |
| CN | 106537979 A | 3/2017 |
| EP | 3 031 262 A1 | 6/2016 |
| EP | 3 827 633 A0 | 6/2021 |
| WO | WO-2015/021185 A1 | 2/2015 |
| WO | WO-2017/010477 A1 | 1/2017 |
| WO | WO-2018/127179 A1 | 7/2018 |
| WO | WO-2018/169355 A1 | 9/2018 |
| WO | WO-2020/029253 A1 | 2/2020 |

OTHER PUBLICATIONS

First Exam Report on IN 202127023594 dated May 25, 2022 (6 pages).
Zte, "Consideration on scheduling enhancement for MTC", 3GPP TSG RAN WG1 Meeting #94bis; R1-1810501, Chengdu, CN, Sep. 29, 2018 (10 pages).
Foreign Action other than Search Report on JP 2021-523597, dated Aug. 10, 2022 (with English translation, 24 pages).
Samsung, "Scheduling of multiple transport blocks for MTC" 3GPP TSG RAN WG1 Meeting #94bis, R1-1810822, Oct. 12, 2018, Chengdu, China (7 pages).
Office Action for KR Appl. No. 10-2021-7016603, dated Apr. 24, 2024 (with English translation, 7 pages).

* cited by examiner

METHOD AND APPARATUS FOR TRANSMITTING DOWNLINK CONTROL INFORMATION

CROSS-REFERENCE TO RELATED APPLICATIONS

This application claims the benefit of priority under 35 U.S.C. § 120 as a continuation of PCT Patent Application No. PCT/CN2019/114249, filed on Oct. 30, 2019, which claims priority to Chinese patent application no. 201811302529.3, filed on Nov. 2, 2018, the disclosure of each of which is incorporated herein by reference in its entirety.

TECHNICAL FIELD

The present disclosure relates to the field of communications.

BACKGROUND

Based on the current Rel-15 narrowband Internet of things (NB-IoT), in machine-type communications (MTC) and 5G new radio (NR) systems, a multi-process mechanism effectively improves data transmission efficiency. For a single access user, to improve the system throughput, periodic traffic such as voice over Internet protocol (VoIP) traffic in the data domain uses a semi-static scheduling mode and has the characteristics of one-time authorization and periodic use, thereby greatly reducing the control signaling overhead. However, this approach is not suitable for non-periodic traffic. In the approved Rel-16, a scheduling enhancement direction is explicitly proposed in which multiple transport blocks (TBs) are scheduled through one physical downlink control channel (PDCCH).

SUMMARY

According to one aspect of embodiments of the present disclosure, a method for transmitting downlink control information is provided. The method includes steps described below, the downlink control information (DCI) is transmitted through a physical downlink control channel (PDCCH); and multiple transport blocks (TBs) are scheduled through the DCI. The scheduled multiple TBs are indicated by hybrid automatic repeat request (HARQ) process information and new data indicator (NDI) information in the DCI.

According to another aspect of embodiments of the present disclosure, another method for transmitting downlink control information is provided. The method includes steps described below, in the case where multiple transport blocks (TBs) are scheduled through one piece of downlink control information (DCI), redundancy versions (RVs) of the scheduled multiple TBs are indicated by an RV signaling field in the DCI, or the RVs of the multiple TBs are set to fixed values; and the DCI is transmitted through a physical downlink control channel (PDCCH).

According to another aspect of embodiments of the present disclosure, an apparatus for transmitting downlink control information is provided. The apparatus includes a first transmission module and a scheduling module, the first transmission module is configured to transmit the downlink control information (DCI) through a physical downlink control channel (PDCCH); and the scheduling module is configured to schedule multiple transport blocks (TBs) through the DCI. The scheduled multiple TBs are indicated by hybrid automatic repeat request (HARQ) process information and new data indicator (NDI) information in the DCI.

According to another aspect of embodiments of the present disclosure, another apparatus for transmitting downlink control information is provided. The apparatus includes a scheduling indication module and a second transmission module, the scheduling indication module is configured to, in the case where multiple transport blocks (TBs) are scheduled through one piece of downlink control information (DCI), indicate redundancy versions (RVs) of the scheduled multiple TBs by an RV signaling field in the DCI or set the RVs of the multiple TBs to fixed values; and the second transmission module is configured to transmit the DCI through a physical downlink control channel (PDCCH).

According to another aspect of embodiments of the present disclosure, a storage medium is provided. The storage medium stores a computer program configured to, when executed, cause the method for transmitting downlink control information according to any preceding aspect of embodiments of the present disclosure to be performed.

According to another aspect of embodiments of the present disclosure, an electronic apparatus is provided. The electronic apparatus includes a memory and a processor. The memory stores a computer program. The processor is configured to execute the computer program to perform the method for transmitting downlink control information according to any preceding aspect of embodiments of the present disclosure.

DETAILED DESCRIPTION

The present disclosure is described in detail hereinafter with reference to drawings and in conjunction with embodiments. It is to be noted that if not in collision, the embodiments and features therein in the present disclosure may be combined with one another.

It is to be noted that the terms "first", "second" and the like in the description, claims and drawings of the present disclosure are used for distinguishing between similar objects and are not necessarily used for describing a particular order or sequence.

When scheduling is based on a single TB, scheduling of one TB needs to be indicated by one PDCCH. When multiple TBs are scheduled through one PDCCH, configuration information of each TB needs to be indicated. The greater the number of hybrid automatic repeat request (HARQ) processes supported by a system, the greater the one-to-many invocation ability of the system, that is, the greater the number of TBs that can be invoked through one PDCCH. In the current version, each TB needs to be indicated by downlink control information (DCI) of one PDCCH. The DCI contains information about different fields such as resource scheduling, modulation and coding, and process. How to indicate control information of multiple TBs through one PDCCH at relatively low overheads is the main problem faced by scheduling enhancement. However, a solution to the problem of how to indicate control information of multiple TBs through one PDCCH is not proposed in the related art.

Figure 1:
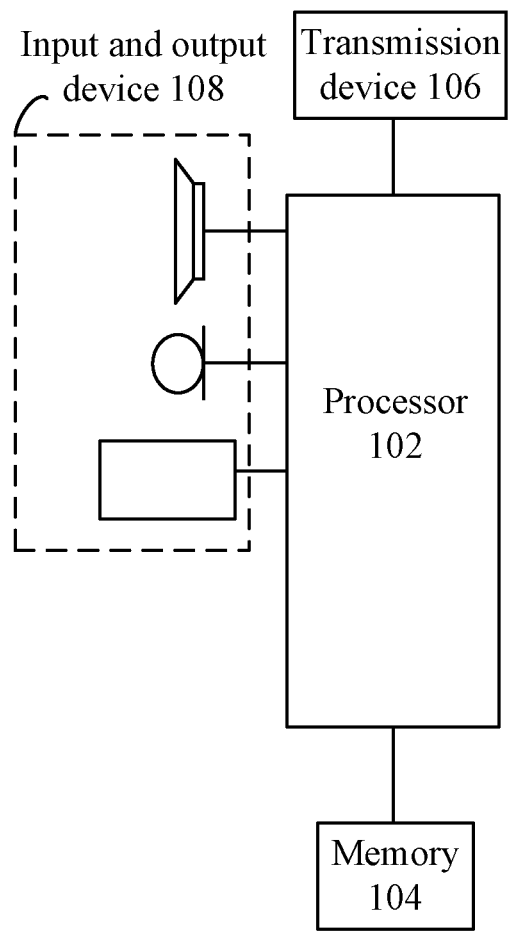
FIG. 1 is a block diagram illustrating a hardware structure of a mobile terminal for performing a method for transmitting downlink control information according to embodiments of the present disclosure.

Embodiments of the present disclosure provide a method for transmitting downlink control information. The method may be performed on a mobile terminal, a computer terminal, or a similar computing apparatus. Exemplarily, the method is performed on a mobile terminal. FIG. 1 is a hardware block diagram of a mobile terminal executing the method for transmitting downlink control information according to embodiments of the present disclosure. As shown in FIG. 1, the mobile terminal may include one or more (only one is shown in FIG. 1) processors 102 (including, but not limited to, processing apparatuses such as a microcontroller unit (MCU) or a field-programmable gate array (FPGA)) and a memory 104 for storing data. According to embodiments of the present disclosure, the mobile terminal may further include a transmission device 106 used for communications and an input and output device 108. It is to be understood by those having ordinary skill in the art that the structure shown in FIG. 1 is merely illustrative and does not limit the structure of the preceding mobile terminal. For example, the mobile terminal may further include more or fewer components than that shown in FIG. 1 or have a configuration different from that shown in FIG. 1.

The memory 104 may be used for storing a computer program, for example, application software programs and modules such as the computer program corresponding to the method for transmitting downlink control information according to embodiments of the present disclosure. The processor 102 executes the computer program stored in the memory 104 to perform various function applications and data processing, that is, perform the preceding method. The memory 104 may include a high-speed random-access memory and may also include a non-volatile memory such as one or more magnetic storage apparatuses, flash memories, or other non-volatile solid-state memories. In an example embodiment, the memory 104 may further include memories disposed remote from the processor 102. These remote memories may be connected to the mobile terminal 10 via a network. Examples of the preceding network include, but are not limited to, the Internet, an intranet, a local area network, a mobile communication network and a combination thereof.

The transmission device 106 is used for receiving or sending data via a network. Examples of the preceding network may include a wireless network provided by a communication provider of the mobile terminal 10. In an example embodiment, the transmission device 106 includes a network interface controller (NIC) that may be connected to other network devices via a base station to communicate with the Internet. In an example embodiment, the transmission device 106 may be a radio frequency (RF) module used for communicating with the Internet wirelessly.

Figure 2:
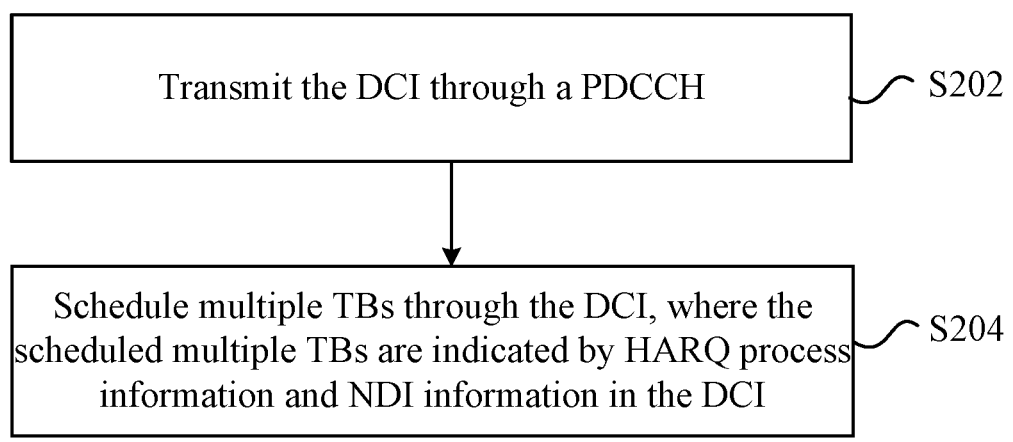
FIG. 2 is a flowchart of a method for transmitting downlink control information according to embodiments of the present disclosure.

Embodiments of the present disclosure provide a method for transmitting downlink control information. The method is applicable to a base station. After slot aggregation, the downlink control information is sent to the preceding mobile terminal. FIG. 2 is a flowchart of a method for transmitting downlink control information according to embodiments of the present disclosure. As shown in FIG. 2, the method for transmitting downlink control information may include step S202 and step S204.

In step S202, the downlink control information (DCI) is transmitted through a physical downlink control channel (PDCCH).

In step S204, multiple transport blocks (TBs) are scheduled through the DCI. The scheduled multiple TBs are indicated by hybrid automatic repeat request (HARQ) process information and new data indicator (NDI) information in the DCI.

According to embodiments of the present disclosure, multiple TBs are scheduled through one PDCCH. The multiple TBs are scheduled through a joint indication of an NDI field and an HARQ process field in one piece of DCI. The DCI is transmitted through the PDCCH. Therefore, the problem of how to indicate control information of multiple TBs through one PDCCH in the related art can be solved, and multiple TBs can be scheduled through one piece of DCI at relatively low overheads.

According to embodiments of the present disclosure, the maximum number of the multiple TBs is less than or equal to the maximum supported number of HARQ processes for scheduling.

According to embodiments of the present disclosure, the method may further include a step described below, in the case where the maximum number of the multiple TBs is 4 and the maximum supported number of HARQ processes for scheduling is 4, the NDI information is indicated through a first signaling field and process scheduling information of an HARQ process field is indicated through a second signaling field.

According to embodiments of the present disclosure, the first signaling field occupies 1 bit, and the second signaling field occupies 1 bit; alternatively, the first signaling field occupies 1 bit, and the second signaling field occupies 2 bits; alternatively, the first signaling field occupies 1 bit, and the second signaling field occupies 3 bits; alternatively, the first signaling field occupies 1 bit, and the second signaling field occupies 4 bits.

According to embodiments of the present disclosure, process states of the HARQ process field include X states of 1 process, Y states of 2 processes, Z states of 3 processes, and M states of 4 processes. X, Y, Z, and M are natural numbers.

According to embodiments of the present disclosure, in the case where the second signaling field occupies 1 bit, the supported number of the HARQ processes for scheduling includes 1 and 4, and $X+M=2$; or in the case where the second signaling field occupies 2 bits, $X+Y+Z+M \leq 4$; or in the case where the second signaling field occupies 3 bits, $X+Y+Z+M \leq 8$; or in the case where the second signaling field occupies 4 bits, $X+Y+Z+M \leq 16$.

According to embodiments of the present disclosure, in the case where the second signaling field occupies 1 bit, $X=1$, and $M=1$; or in the case where the second signaling field occupies 2 bits, $X+Y+Z+M \leq 4$, $X \geq 1$, and $M=1$; or in the case where the second signaling field occupies 3 bits, $X+Y+Z+M \leq 8$, $X \geq 1$, and $M=1$; or in the case where the second signaling field occupies 4 bits, $X+Y+Z+M \leq 16$, $X \geq 1$, and $M=1$.

According to embodiments of the present disclosure, in the case where the second signaling field occupies 2 bits, X=1, Y=1, Z=1, and M=1; or X=2, Y=1, Z=0, and M=1; or X=1, Y=2, Z=0, and M=1. Alternatively, in the case where the second signaling field occupies 3 bits, X=4, Y=3, Z=0, and M=1; or X=4, Y=2, Z=1, and M=1; or X=4, Y=1, Z=2, and M=1; or X=2, Y=3, Z=2, and M=1. Alternatively, in the case where the second signaling field occupies 4 bits, X=4, Y=6, Z=4, and M=1.

According to embodiments of the present disclosure, in the case where the second signaling field occupies 1 bit, process scheduling states of the HARQ process field indicated by the second signaling field include at least one of processes 0, 1, 2, and 3; or process 0.

According to embodiments of the present disclosure, in the case where the second signaling field occupies 2 bits, the process scheduling states of the HARQ process field indicated by the second signaling field include at least one of processes 0, 1, 2, and 3; processes 0, 1, and 2; processes 0 and 1; or process 3. Alternatively, in the case where the second signaling field occupies 2 bits, the process scheduling states of the HARQ process field indicated by the second signaling field include at least one of processes 0, 1, 2, and 3; processes 0 and 1; process 0; or process 1.

Alternatively, in the case where the second signaling field occupies 2 bits, the process scheduling states of the HARQ process field indicated by the second signaling field include at least one of processes 0, 1, 2, and 3; processes 0 and 1; processes 2 and 3; or process 0.

According to embodiments of the present disclosure, in the case where the second signaling field occupies 3 bits, the process scheduling states of the HARQ process field indicated by the second signaling field include at least one of processes 0, 1, 2, and 3; processes 0, 1, and 2; processes 1, 2, and 3; processes 0 and 1; processes 1 and 2; processes 2 and 3; process 0; or process 3.

According to embodiments of the present disclosure, in the case where the second signaling field occupies 3 bits, the process scheduling states of the HARQ process field indicated by the second signaling field include at least one of processes 0, 1, 2, and 3; processes 0 and 1; processes 2 and 3; process 0; process 1; process 2; process 3; or processes 0, 1, and 2. Alternatively, in the case where the second signaling field occupies 3 bits, the process scheduling states of the HARQ process field indicated by the second signaling field include at least one of processes 0, 1, 2, and 3; processes 0 and 1; processes 2 and 3; processes 1 and 2; process 0; process 1; process 2; or process 3. Alternatively, in the case where the second signaling field occupies 3 bits, the process scheduling states of the HARQ process field indicated by the second signaling field include at least one of processes 0, 1, 2, and 3; processes 0 and 1; processes 2 and 3; processes 0 and 2; process 0; process 1; process 2; or process 3.

According to embodiments of the present disclosure, the method may further include a step described below, in the case where the maximum number of the multiple TBs is 4 and the maximum supported number of HARQ processes for scheduling is 4, the NDI information and process scheduling information of an HARQ process field is indicated through a third signaling field.

According to embodiments of the present disclosure, the third signaling field occupies 5 bits, 6 bits, or 7 bits.

According to embodiments of the present disclosure, the process states of the HARQ process field include X states of 1 process, Y states of 2 processes, Z states of 3 processes, and M states of 4 processes.

According to embodiments of the present disclosure, in the case where the third signaling field occupies 5 bits, $X+Y+Z+M \leq 32$; or in the case where the third signaling field occupies 6 bits, $X+Y+Z+M \leq 64$; or in the case where the third signaling field occupies 7 bits, $X+Y+Z+M \leq 128$.

According to embodiments of the present disclosure, in the case where the third signaling field occupies 5 bits, X=8, and $Y+Z+M \leq 24$; or X=4, and $Y+Z+M \leq 28$; or X=1, and $Y+Z+M \leq 31$.

According to embodiments of the present disclosure, in the case where the third signaling field occupies 6 bits, X=8, and $Y+Z+M \leq 56$.

According to embodiments of the present disclosure, in the case where the third signaling field occupies 7 bits, $X+Y+Z+M=80$, where X=8, Y=24, Z=32, and M=16.

According to embodiments of the present disclosure, in the case where the third signaling field occupies 5 bits, the process scheduling states of the HARQ process field indicated by the third signaling field include at least one of processes 0, 1, 2, and 3, and NDI=0 or 1; processes 0 and 1, and NDI=0 or 1; processes 2 and 3, and NDI=0 or 1; process 0, and NDI=0 or 1; process 1, and NDI=0 or 1; process 2, and NDI=0 or 1; process 3, and NDI=0 or 1; process 0, and NDI=0+process 1, and NDI=1; process 0, and NDI=0+processes 1, 2, and 3, and NDI=1; process 1, and NDI=0+process 0, and NDI=1; process 1, and NDI=0+processes 0, 2, and 3, and NDI=1; process 2, and NDI=0+process 3, and NDI=1; process 2, and NDI=0+processes 0, 1, and 3, and NDI=1; process 3, and NDI=0+process 2, and NDI=1; process 3, and NDI=0+processes 0, 1, and 2, and NDI=1; processes 0 and 1, and NDI=0+processes 2 and 3, and NDI=1; or processes 2 and 3, and NDI=0+processes 0 and 1, and NDI=1.

According to embodiments of the present disclosure, the method may further include a step described below, in the case where the maximum number of the multiple TBs is 8 and the maximum supported number of HARQ processes for scheduling is 8, the NDI information is indicated through a fourth signaling field and process scheduling information of an HARQ process field is indicated through a fifth signaling field.

According to embodiments of the present disclosure, the supported number of the HARQ processes for scheduling includes 1, 2, 3, 4, 6, and 8; or 1, 2, 4, 6, and 8; or 1, 4, and 8; or 1, 2, 3, 4, and 8; or 1, 2, 4, and 8; or 1, 2, 4, 7, and 8.

According to embodiments of the present disclosure, the fourth signaling field occupies 1 bit, and the fifth signaling field occupies 3 bits; or the fourth signaling field occupies 1 bit, and the fifth signaling field occupies 4 bits; or the fourth signaling field occupies 1 bit, and the fifth signaling field occupies 5 bits.

According to embodiments of the present disclosure, process states of the HARQ process field include X states of 1 process, Y states of 2 processes, Z states of 3 processes, M states of 4 processes, N states of 5 processes, P states of 6 processes, Q states of 7 processes, and R states of 8 processes, where X, Y, Z, M, N, P, Q, and R are natural numbers.

According to embodiments of the present disclosure, in the case where the fifth signaling field occupies 3 bits, R=1, and $X+Y+Z+M+N+P+Q+R \leq 8$.

According to embodiments of the present disclosure, in the case where the fifth signaling field occupies 4 bits, R=1, and $X+Y+Z+M+N+P+Q+R \leq 16$.

According to embodiments of the present disclosure, in the case where the fifth signaling field occupies 5 bits, R=1, and $X+Y+Z+M+N+P+Q+R \leq 32$.

According to embodiments of the present disclosure, in the case where the fifth signaling field occupies 3 bits, X=1, Y=1, Z=1, M=1, N=1, P=1, Q=1, and R=1; or X=4, Y=2, R=1, and 0≤Z+M+N+P+Q≤1; or X=1, Y=2, Z=0, M=2, N=0, P=2, Q=0, and R=1; or X=1, Y=2, Z=2, M=2, N=0, P=0, Q=0, and R=1; or X=1, Y=2, Z=2, M=2, N=0, P=0, Q=0, and R=1; or X=1, Y=0, Z=2, M=2, N=2, P=0, Q=0, and R=1; or X=1, Y=2, Z=0, M=2, N=2, P=0, Q=0, and R=1.

According to embodiments of the present disclosure, in the case where the fifth signaling field occupies 4 bits, X=8, R=1, and Y+Z+M+P+N+Q≤7; or X=8, Y=4, M=2, R=1, and 0≤Z+P+N+Q≤1; or X=4, R=1, and Y+Z+M+P+N+Q≤11; or X=4, Y=4, M=2, R=1, and 0≤Z+N+P+Q≤5.

According to embodiments of the present disclosure, in the case where the fifth signaling field occupies 5 bits, X+Y+Z+M+N+P+Q+R≤32; and X=8, and R=1; or X=4, and R=1; or X=2, and R=1.

According to embodiments of the present disclosure, in the case where the fifth signaling field occupies 4 bits, the case where Y+Z+M+P+N+Q≤7, R=1, and X=8 includes at least one of: Y=4, M=2, and Z=1; Y=4, M=2, and N=1; Y=4, M=2, and P=1; or Y=4, M=2, and Q=1. Alternatively, in the case where the fifth signaling field occupies 4 bits, the case where Y+Z+M+P+N+Q≤11, R=1, and X=4 includes at least one of: Y=4, M=2, Z=2, P=1, Q=1, and N=1; or Y=3, M=2, Z=3, P=1, Q=1, and N=1.

According to embodiments of the present disclosure, in the case where the fifth signaling field occupies 5 bits, the case where X=8, R=1, and Y+Z+M+N+P+Q≤23 includes at least one of: Q=2, P=3, N=4, M=4, Y=5, and Z=5, Q=2, P=3, N=4, M=4, Y=6, and Z=4; or Q=2, P=2, N=2, M=4, Y=7, and Z=6. Alternatively, in the case where the fifth signaling field occupies 5 bits, Q=2, P=3, N=4, M=5, Y=7, and Z=6 in the case where X=4, R=1, and Y+Z+M+N+P+Q≤27. Alternatively, in the case where the fifth signaling field occupies 5 bits, the case where X=2, R=1, and Y+Z+M+N+P+Q≤29 includes at least one of: Q=2, P=3, N=4, M=5, Y=9, and Z=6, Q=2, P=3, N=4, M=5, Y=8, and Z=7, Q=2, P=3, N=4, M=5, Y=7, and Z=8; or Q=2, P=3, N=4, M=7, Y=7, and Z=6.

According to embodiments of the present disclosure, in the case where the fifth signaling field occupies 4 bits, the process scheduling states of the HARQ process field indicated by the fifth signaling field include at least one of processes 0, 1, 2, 3, 4, 5, 6, and 7; processes 0, 1, 2, 3, 4, and 5; processes 0, 1, 2, and 3; processes 4, 5, 6, and 7; processes 0 and 1; processes 2 and 3; processes 4 and 5; processes 6 and 7; process 0; process 1; process 2; process 3; process 4; process 5; process 6; or process 7.

According to embodiments of the present disclosure, in the case where the fifth signaling field occupies 5 bits, the process scheduling states of the HARQ process field indicated by the fifth signaling field include at least one of processes 0, 1, 2, 3, 4, 5, 6, and 7; processes 0, 1, 2, 3, and 4; processes 1, 2, 3, 4, and 5; processes 2, 3, 4, 5, and 6; processes 3, 4, 5, 6, and 7; processes 0, 1, and 2; processes 1, 2, and 3; processes 2, 3, and 4; processes 3, 4, and 5; processes 4, 5, and 6; processes 5, 6, and 7; processes 0 and 1; processes 1 and 2; processes 2 and 3; processes 3 and 4; processes 4 and 5; processes 5 and 6; processes 6 and 7; process 0; process 1; process 2; process 3; process 4; process 5; process 6; or process 7.

According to embodiments of the present disclosure, in the case where the maximum number of the multiple TBs is 4 and the maximum supported number of HARQ processes for scheduling is 4, the number of processes supporting hybrid transmission includes at least 2 processes and 4 processes; or the number of processes supporting hybrid transmission includes at least 2 processes and 3 processes; or the number of processes supporting hybrid transmission includes at least 2 processes.

According to embodiments of the present disclosure, in the case where the maximum number of the multiple TBs is 8 and the maximum supported number of HARQ processes for scheduling is 8, the number of processes supporting hybrid transmission includes at least 2 processes, 4 processes, and 8 processes; or the number of processes supporting hybrid transmission includes at least 2 processes, 3 processes, and 4 processes; or the number of processes supporting hybrid transmission includes at least 2 processes and 4 processes; or the number of processes supporting hybrid transmission includes at least 2 processes and 3 processes; or includes at least 2 processes.

According to embodiments of the present disclosure, the method may further include a step described below, in the case where the maximum number of TBs scheduled by one piece of DCI is 8 and the maximum supported number of HARQ processes for scheduling is 8, the NDI information and process scheduling information of an HARQ process field is indicated through a sixth signaling field.

According to embodiments of the present disclosure, the sixth signaling field occupies 5 bits, 6 bits, or 7 bits.

According to embodiments of the present disclosure, the method may further include a step described below, in the case where the maximum number of the multiple TBs is less than the maximum supported number of the HARQ processes for scheduling, scheduling of the HARQ processes is indicated through a configured number of HARQ processes and an offset indication field. The number of HARQ processes are configured in at least one of the following manners: predefined, obtained from a process set configured by a base station, configured through higher-layer signaling, or configured through an HARQ process field in the DCI; and the offset indication field is configured to indicate an offset based on the configured number of HARQ processes.

According to embodiments of the present disclosure, in the case where one TB is fed back through one bit, and one bit corresponds to one uplink resource, frequency domain positions of uplink resources for transmitting acknowledgment/negative acknowledgment (ACK/NACK) corresponding to the multiple TBs scheduled through the DCI are the same; or in the case where the multiple TBs are fed back through multiple bits, and the multiple bits are fed back on one uplink resource, the frequency domain positions of the uplink resources for transmitting the ACK/NACK corresponding to the multiple TBs scheduled through the DCI are determined according to higher-layer configuration signaling and an offset (ARO); or in the case where one TB is fed back through one bit, and a half-duplex terminal is used, the uplink resources for transmitting the ACK/NACK corresponding to the multiple TBs scheduled through the DCI are located on continuous valid uplink subframes in time domain.

According to embodiments of the present disclosure, the method may further include a step described below, in the case where the DCI triggers aperiodic channel state information (CSI) reporting, positions of aperiodic CSI resources, a size of the aperiodic CSI resources, or the size of TBs transmitted together with the aperiodic CSI resources is determined in one of the following manners: in the case of non-hybrid transmission, the aperiodic CSI resources are transmitted on a first newly transmitted TB; in the case of hybrid transmission, the aperiodic CSI resources are transmitted on a first retransmitted TB; the aperiodic CSI resources are transmitted on individual resources; the size of the TBs transmitted together with the aperiodic CSI resources is smaller than the size of other TBs except the TBs transmitted together with the aperiodic CSI resources, where the other TBs are among the multiple TBs scheduled through the DCI; or resources corresponding to the TBs transmitted together with the aperiodic CSI resources are greater in size than resources corresponding to other TBs except the TBs transmitted together with the aperiodic CSI resources, where the other TBs are among the multiple TBs scheduled through the DCI.

According to embodiments of the present disclosure, multiple TBs are scheduled through one PDCCH. The multiple TBs are scheduled through a joint indication of the NDI field and the HARQ process field in one piece of DCI. The DCI is transmitted through the PDCCH. Therefore, the problem of how to indicate control information of multiple TBs through one PDCCH in the related art can be solved, and multiple TBs can be scheduled through one piece of DCI at relatively low overheads.

Figure 3:
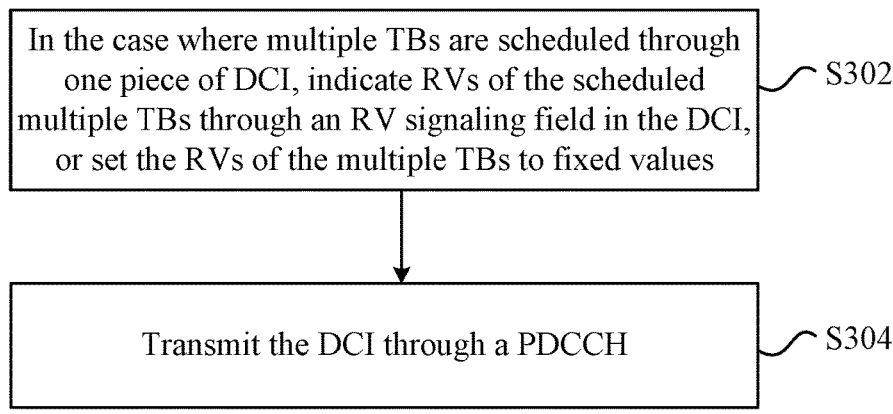
FIG. 3 is a flowchart of another method for transmitting downlink control information according to embodiments of the present disclosure.

Embodiments of the present disclosure further provide a method for transmitting downlink control information. FIG. 3 is a flowchart of another method for transmitting downlink control information according to embodiments of the present disclosure. As shown in FIG. 3, the method for transmitting downlink control information may include step S302 and step S304.

In step S302, in the case where multiple transport blocks (TBs) are scheduled through one piece of downlink control information (DCI), redundancy versions (RVs) of the scheduled multiple TBs are indicated through an RV signaling field in the DCI, or the RVs of the multiple TBs are set to fixed values.

In step S304, the DCI is transmitted through a physical downlink control channel (PDCCH).

According to embodiments of the present disclosure, in the case where the multiple TBs include a newly transmitted TB and a retransmitted TB, the RV of the newly transmitted TB is a fixed value, and the RV of the retransmitted TB is indicated by the RV signaling field in the DCI; alternatively, in the case where the multiple TBs include only newly transmitted TBs, the RVs of the multiple TBs are the same, where the RVs are indicated by the RV signaling field in the DCI or the RVs are the fixed values; alternatively, in the case where the multiple TBs include only retransmitted TBs, the RVs of the multiple TBs are the same, where the RVs are indicated by the RV signaling field in the DCI.

According to embodiments of the present disclosure, in the case where an RV of a newly transmitted TB is the fixed value, the RV of the newly transmitted TB is RV0, RV1, RV2, or RV3.

According to embodiments of the present disclosure, in the case where one TB is fed back through one bit, and one bit corresponds to one uplink resource, frequency domain positions of uplink resources for transmitting ACK/NACK corresponding to the multiple TBs scheduled through the DCI are the same; alternatively, in the case where the multiple TBs are fed back through multiple bits, and the multiple bits are fed back on one uplink resource, the frequency domain positions of the uplink resources for transmitting the ACK/NACK corresponding to the multiple TBs scheduled through the DCI are determined according to higher-layer configuration signaling and an offset (ARO); alternatively, in the case where one TB is fed back through one bit, and a half-duplex terminal is used, the uplink resources for transmitting the ACK/NACK corresponding to the multiple TBs scheduled through the DCI are located on continuous valid uplink subframes in time domain.

Embodiments of the present disclosure are described in detail hereinafter by way of examples. These examples provide a DCI indication method in which newly transmitted TBs and retransmitted TBs are in 8 processes or 4 processes in the case where the 8 processes or the 4 processes are scheduled through one PDCCH.

In the case where the number of processes is 4 and the maximum supported number of TBs for scheduling is 4, the HARQ process field is indicated when the 4 TBs are scheduled in a manner of hybrid transmission and non-hybrid transmission. In the case where the number of processes is 8 and the maximum supported number of TBs for scheduling is 8, the HARQ process field is indicated when the 8 TBs are scheduled in the manner of hybrid transmission and non-hybrid transmission.

Moreover, in the case where multiple TBs are scheduled, solutions to RV indication and ACK/NACK resource determination are also provided.

In the case where multiple TBs are scheduled through one PDCCH, the scheduled multiple TBs are indicated by new data indicator (NDI) information and hybrid automatic repeat request (HARQ) process information in the DCI; and the DCI is transmitted through the PDCCH.

According to embodiments of the present disclosure, in the case where the scheduled multiple TBs are indicated by the NDI information and HARQ process information in the DCI, the maximum supported number of TBs for scheduling is less than or equal to the maximum number of processes; and a newly transmitted TB and a retransmitted TB are indicated through different PDCCHs, alternatively, a newly transmitted TB and a retransmitted TB are indicated through the same PDCCH.

According to embodiments of the present disclosure, in the case where the maximum supported number of TBs for scheduling is 4, the number of processes is 4, and a newly transmitted TB and a retransmitted TB cannot be transmitted in the hybrid manner, the NDI information is indicated through a first signaling field, and the process scheduling information of the HARQ process field is indicated through a second signaling field.

According to embodiments of the present disclosure, the first signaling field occupies 1 bit, the second signaling field occupies 1 bit, and the supported number of HARQ processes for scheduling includes 1 and 4. Alternatively, the first signaling field occupies 1 bit, the second signaling field occupies 2 bits, and the supported number of HARQ processes for scheduling includes 1, 2, 3, and 4; or 1, 2, and 4; or 1, 3, and 4. Alternatively, the first signaling field occupies 1 bit, the second signaling field occupies 3 bits, and the supported number of HARQ processes for scheduling includes 1, 2, 3, and 4; or 1, 2, and 4; or 1, 3, and 4.

According to embodiments of the present disclosure, the number of processes supporting scheduling includes 1, 2, 3, and 4; or 1, 2, and 4; or 1, and 4.

According to embodiments of the present disclosure, in the case where the second signaling field occupies 1 bit, the HARQ process scheduling states indicated by the second signaling field include at least one of processes 0, 1, 2, and 3; or process 0.

According to embodiments of the present disclosure, in the case where the second signaling field occupies 2 bits, the HARQ process states indicated by the second signaling field include at least one of processes 0, 1, 2, and 3; processes 0, 1, and 2; processes 0 and 1; or process 3. Alternatively, in the case where the second signaling field occupies 2 bits, the HARQ process states indicated by the second signaling field include at least one of processes 0, 1, 2, and 3; processes 0 and 1; process 0; or process 1. Alternatively, in the case where the second signaling field occupies 2 bits, the HARQ process states indicated by the second signaling field include at least one of processes 0, 1, 2, and 3; processes 0 and 1; process 2, and 3; or process 0.

According to embodiments of the present disclosure, in the case where the second signaling field occupies 3 bits, the HARQ process states indicated by the second signaling field include at least one of processes 0, 1, 2, and 3; processes 0, 1, and 2; processes 1, 2, and 3; processes 0 and 1; processes 1 and 2; processes 2 and 3; process 0; or process 3.

According to embodiments of the present disclosure, in the case where the second signaling field occupies 3 bits, the HARQ process states indicated by the second signaling field include at least one of processes 0, 1, 2, and 3; processes 0 and 1; processes 2 and 3; process 0; process 1; process 2; process 3; or processes 0, 1, and 2. Alternatively, in the case where the second signaling field occupies 3 bits, the HARQ process states indicated by the second signaling field include at least one of processes 0, 1, 2, and 3; processes 0 and 1; processes 2 and 3; processes 1 and 2; process 0; process 1; process 2; or process 3. Alternatively, in the case where the second signaling field occupies 3 bits, the HARQ process states indicated by the second signaling field include at least one of processes 0, 1, 2, and 3; processes 0 and 1; processes 2 and 3; processes 0 and 2; process 0; process 1; process 2; or process 3.

According to embodiments of the present disclosure, in the case where the maximum supported number of TBs for scheduling is 4, the number of processes is 4, and a newly transmitted TB and a retransmitted TB can be transmitted in the hybrid manner, the NDI information and the process scheduling information of the HARQ process field are indicated through a third signaling field. The third signaling field occupies 5 bits, 6 bits, or 7 bits.

According to embodiments of the present disclosure, in the case where the third signaling field occupies 5 bits, the process states indicated by the third signaling field include at least one of: processes 0, 1, 2, and 3 (NDI=0 or 1); processes 0 and 1 (NDI=0 or 1); processes 2 and 3 (NDI=0 or 1); process 0 (NDI=0 or 1); process 1 (NDI=0 or 1); process 2 (NDI=0 or 1); process 3 (NDI=0 or 1); process 0 (NDI=0)+process 1 (NDI=1); process 0 (NDI=0)+processes 1, 2, and 3 (NDI=1); process 1 (NDI=0)+process 0 (NDI=1); process 1 (NDI=0)+processes 0, 2, and 3 (NDI=1); process 2 (NDI=0)+process 3 (NDI=1); process 2 (NDI=0)+processes 0, 1, and 3 (NDI=1); process 3 (NDI=0)+process 2 (NDI=1); process 3 (NDI=0)+processes 0, 1, and 2 (NDI=1); processes 0 and 1 (NDI=0)+processes 2 and 3 (NDI=1); or processes 2 and 3 (NDI=0)+processes 0 and 1 (NDI=1).

According to embodiments of the present disclosure, in the case where the maximum supported number of TBs for scheduling is 8, the number of processes is 8, and a newly transmitted TB and a retransmitted TB cannot be transmitted in the hybrid manner, the NDI information is indicated through a fourth signaling field, and the process scheduling information of the HARQ process field is indicated through a fifth signaling field.

According to embodiments of the present disclosure, the number of processes supporting scheduling includes 1, 2, 3, 4, 6, and 8; or 1, 2, 4, 6, and 8, or 1, and 4.

According to embodiments of the present disclosure, the fourth signaling field occupies 1 bit, and the fifth signaling field occupies 4 bits; alternatively, the fourth signaling field occupies 1 bit, and the fifth signaling field occupies 5 bits.

According to embodiments of the present disclosure, in the case where the fifth signaling field occupies 4 bits, the process states indicated by the fifth signaling field include at least one of processes 0, 1, 2, 3, 4, 5, 6, and 7; processes 0, 1, 2, 3, 4, and 5; processes 0, 1, 2, and 3; processes 4, 5, 6, and 7; processes 0 and 1; processes 2 and 3; processes 4 and 5; processes 6 and 7; process 0; process 1; process 2; process 3; process 4; process 5; process 6; or process 7.

According to embodiments of the present disclosure, in the case where the fifth signaling field occupies 5 bits, the process states indicated by the fifth signaling field include at least one of processes 0, 1, 2, 3, 4, 5, 6, and 7; processes 0, 1, 2, 3, and 4; processes 1, 2, 3, 4, and 5; processes 2, 3, 4, 5, and 6; processes 3, 4, 5, 6, and 7; processes 0, 1, and 2; processes 1, 2, and 3; processes 2, 3, and 4; processes 3, 4, and 5; processes 4, 5, and 6; processes 5, 6, and 7; processes 0 and 1; processes 1 and 2; processes 2 and 3; processes 3 and 4; processes 4 and 5; processes 5 and 6; processes 6 and 7; process 0; process 1; process 2; process 3; process 4; process 5; process 6; or process 7.

According to embodiments of the present disclosure, in the case where the maximum supported number of TBs for scheduling is 8, the number of processes is 8, and a newly transmitted TB and a retransmitted TB can be transmitted in the hybrid manner, the NDI information and the process scheduling information of the HARQ process field are indicated through a sixth signaling field. The sixth signaling field occupies 5 bits, 6 bits, or 7 bits.

In the case where multiple TBs are scheduled through one PDCCH, redundancy versions of the scheduled multiple TBs are indicated through an RV indication in the DCI, or the redundancy versions are default values not requiring an indication by the DCI; and the DCI is transmitted through the PDCCH.

According to embodiments of the present disclosure, in the case of hybrid transmission, the RV of the newly transmitted TB is fixed, and the RV of the retransmitted TB is indicated by an RV indication signaling field in the DCI. In the case of non-hybrid transmission, the RV of the newly transmitted TB and the RV of the retransmitted TB are the same and are fixed or indicated by the RV indication signaling field in the DCI.

According to embodiments of the present disclosure, in the case where an RV of the first transmitted TB is fixed, the RV of the first transmitted TB is RV0, RV1, RV2, or RV3.

In the case where multiple TBs are scheduled through one PDCCH and one TB needs one bit for the specific feedback, frequency domain positions of uplink resources for transmitting ACK/NACK corresponding to the multiple TBs scheduled through the DCI are the same. In the case where the multiple TBs are fed back in the manner of multi-multiplexing feedback, the frequency domain positions of the uplink resources for transmitting the ACK/NACK corresponding to the multiple TBs scheduled through the DCI are determined according to higher-layer configuration signaling and an offset (ARO). In the case of the TB-specific feedback and a half-duplex terminal, the uplink resources for transmitting the ACK/NACK corresponding to the multiple TBs scheduled through the DCI are located on continuous valid uplink subframes in time domain.

Embodiments of the present disclosure are described in detail hereinafter by way of examples.

Example One

This example is applicable to a 4-TB scheduling scenario in the case of multi-TB scheduling enhancement. The purpose is to reduce signaling overheads, implement multi-TB scheduling, improve the transmission efficiency, and reduce the overheads. The feature is that in the case of multi-TB scheduling, a newly transmitted TB and a retransmitted TB cannot be transmitted in a hybrid manner, and the maximum number of TBs is equal to the number of processes. Moreover, the feedback is multi-bit feedback, that is, in the case of 4-TB scheduling, 4-bit feedback is performed.

According to this feature, in the case of 4-TB transmission, the feedback information occupies 4 bits regardless of the number of uplink resources used for feedback of the 4 TBs. Further, the TBs cannot be transmitted in the hybrid manner, and the NDI field may uniformly indicate scheduling of all processes. Scheduling of the processes includes one of the states below.

TABLE 1-1

| 4-process non-hybrid transmission state scheduling | |
|---|---|
| Number of Scheduled TBs | Process State |
| 4 TBs | Processes 0, 1, 2, and 3 |
| 2 TBs | Processes 0 and 1 |
| | Processes 2 and 3 |
| 1 TB | Process 0 |
| | Process 1 |
| | Process 2 |
| | Process 3 |
| 3 TBs | Processes 0, 1, and 2 (or processes 1, 2, and 3; or processes 0, 1, and 3; or processes 0, 2, and 3) |

In the case of 2-TB and 3-TB scheduling, the processes may be randomly combined with each other.

TABLE 1-2

| 4-process non-hybrid transmission state scheduling | |
|---|---|
| Number of Scheduled TBs | Process State |
| 4 TBs | Processes 0, 1, 2, and 3 |
| 2 TBs | Processes 0 and 3 |
| | Processes 1 and 2 |
| 1 TB | Process 0 |
| | Process 1 |
| | Process 2 |
| | Process 3 |
| 3 TBs | Processes 0, 2, and 3 |

TABLE 1-3

| 4-process non-hybrid transmission state scheduling | |
|---|---|
| Number of Scheduled TBs | Process State |
| 4 TBs | Processes 0, 1, 2, and 3 |
| 2 TBs | Processes 0 and 1 |
| | Processes 2 and 3 |
| | Processes 1 and 2 |
| 1 TB | Process 0 |
| | Process 1 |
| | Process 2 |
| | Process 3 |

TABLE 1-4

| 4-process non-hybrid transmission state scheduling | |
|---|---|
| Number of Scheduled TBs | Process State |
| 4 TBs | Processes 0, 1, 2, and 3 |
| 2 TBs | Processes 0 and 1 |
| | Processes 2 and 3 |
| | Processes 0 and 2 |
| 1 TB | Process 0 |
| | Process 1 |
| | Process 2 |
| | Process 3 |

In general principle, it ensures that processes 0, 1, 2, and 3 are scheduled, and a state of scheduling one single process exists, then any six processes are selected among the remaining three states of a single process, six states of 2 processes, and four states of 3 processes; in the case where multiple processes are scheduled one time, the serial numbers of the multiple processes are as continuous as possible, and processes scheduled each time do not overlap each other.

In this case, the process field using 3 bits may implement scheduling of multiple TBs in 4 processes. 1 bit of the NDI field indicates new transmission and retransmission of all processes. Indication by 3 bits of the process field enables scheduling of a continuous number of TBs and enables scheduling through a maximum of two PDCCHs regardless of the retransmission state. Table 1-1 is used as an example. In the example, in the case where a multi-bit feedback mechanism indicates that three of four newly transmitted TBs need to be retransmitted, that is, TBs corresponding to processes 0, 1, and 3 need to be retransmitted, it is feasible to first schedule TBs corresponding to processes 0 and 1 and then schedule the TB corresponding to process 3, that is, scheduling is performed twice.

In this example, 4 TBs are scheduled through one PDCCH in the manner in which 4 processes are scheduled by using 3 bits.

Example Two

This example is applicable to a 4-TB scheduling scenario in the case of multi-TB scheduling enhancement. The purpose is to reduce the signaling overheads, implement multi-TB scheduling, improve the transmission efficiency, and reduce the overheads. The feature is that in the case of multi-TB scheduling, a newly transmitted TB and a retransmitted TB can be transmitted in a hybrid manner, the NDI field and the HARQ process field indicate the 4-TB scheduling, and the feedback mode is multi-bit feedback.

According to this feature, in the case of 4-TB transmission, the feedback bits are 4 bits capable of feeding back information about transmission of all processes. Further, since the newly transmitted TB and the retransmitted TB can be transmitted in the hybrid manner, the new transmission or retransmission state of each TB needs to be indicated to a UE. In the case where indication by the NDI field and indication by the process field are performed separately, for example, the process field schedules 4 processes or indicates one of the number of scheduled processes or the number of scheduled TBs, and the NDI field indicates 4 processes, 2 bits to 4 bits are required for the process field and 4 bits are required for the NDI field, that is, a total of 6 bits to 8 bits are required. In this case, the DCI overhead is relatively large and is unacceptable by both the MTC system and the NB-IoT system. Therefore, it is feasible to perform a joint indication by the process field and the NDI field to reduce the DCI overhead.

The number of TBs satisfies a 2-part rule. A simplest application of this rule is as described in Table 2-1.

TABLE 2-1

4-process hybrid transmission state scheduling under the constraint of a 2-part rule

| New Transmission State (NDI = 1) and Retransmission State (NDI = 0) | | Hybrid Transmission State |
|---|---|---|
| Processes 0, 1, 2, and 3 | Processes 0, 1, 2, and 3 | Process 0 (NDI = 0) + process 1 (NDI = 1) |
| | | Process 0 (NDI = 0) + processes 1, 2, and 3 (NDI = 1) |
| Processes 0 and 1 | Processes 0 and 1 | Process 1 (NDI = 0) + process 0 (NDI = 1) |
| Processes 2 and 3 | Processes 2 and 3 | Process 1 (NDI = 0) + processes 0, 2, and 3 (NDI = 1) |
| Process 0 | Process 0 | Process 2 (NDI = 0) + process 3 (NDI = 1) |
| Process 1 | Process 1 | Process 2 (NDI = 0) + processes 0, 1, and 3 (NDI = 1) |
| Process 2 | Process 2 | Process 3 (NDI = 0) + process 2 (NDI = 1) |
| Process 3 | Process 3 | Process 3 (NDI = 0) + processes 0, 1, and 2 (NDI = 1) |
| | | Processes 0 and 1 (NDI = 0) + processes 2 and 3 (NDI = 1) |
| | | Processes 2 and 3 (NDI = 0) + processes 0 and 1 (NDI = 1) |

Any TB and any process can be scheduled after scheduling is performed twice. The preceding table lists a total of 24 states that can be indicated using only 5 bits. It can be seen from the table that one-time scheduling of 3 processes is not supported.

Scheduling of a continuous number of TBs is supported. One manner of such scheduling is as described in Table 2-2.

TABLE 2-2

4-process hybrid transmission state scheduling under the constraint of a continuous number of TBs

| New Transmission State (NDI = 1) and Retransmission State (NDI = 0) | | Hybrid Transmission State |
|---|---|---|
| Processes 0, 1, 2, and 3 | Processes 0, 1, 2, and 3 | Process 0 (NDI = 0) + process 1 (NDI = 1) |
| | | Process 0 (NDI = 0) + processes 1 and 2 (NDI = 1) |
| Processes 0 and 1 | Processes 0 and 1 | Process 0 (NDI = 0) + processes 1, 2, and 3 (NDI = 1) |
| Processes 2 and 3 | Processes 2 and 3 | Process 1 (NDI = 0) + process 0 (NDI = 1) |
| Processes 0, 1, and 2 | Processes 0, 1, and 2 | Process 1 (NDI = 0) + processes 0 and 2 (NDI = 1) |
| Process 0 | Process 0 | Process 1 (NDI = 0) + processes 0, 2, and 3 (NDI = 1) |
| Process 1 | Process 1 | Process 2 (NDI = 0) + process 3 (NDI = 1) |
| Process 2 | Process 2 | Process 2 (NDI = 0) + processes 0 and 1 (NDI = 1) |
| Process 3 | Process 3 | Process 2 (NDI = 0) + processes 0, 1, and 3 (NDI = 1) |
| | | Process 3 (NDI = 0) + process 2 (NDI = 1) |
| | | Process 3 (NDI = 0) + processes 0, 1, and 2 (NDI = 1) |
| | | Processes 0 and 1 (NDI = 0) + process 2 (NDI = 1) |
| | | Processes 0 and 1 (NDI = 0) + processes 2 and 3 (NDI = 1) |
| | | Processes 2 and 3 (NDI = 0) + processes 0 and 1 (NDI = 1) |
| | | Processes 0, 1, and 2 (NDI = 0) + process 3 (NDI = 1) |

The preceding table lists a total of 31 states that can be indicated using only 5 bits. When more hybrid transmission or new transmission states are added, the overhead increases to more than 6 bits. If 5 bits are used, one hybrid transmission state may still be added.

In the case where a maximum of 10 processes are supported and a maximum of 4 TBs scheduled through one PDCCH is supported in hybrid transmission, it is feasible to divide the 10 processes into three groups: 4+4+2. That is, a first group contains 4 processes, a second group contains 4 processes, and a third group contains the remaining 2 processes. Hybrid transmission of 4 processes is indicated in the preceding manner. Hybrid transmission of 2 processes is indicated using 2 bits. Alternatively, the form of 4 processes+offset is used, and the offset is indicated using 3 bits. Depending on different values of the offset, scheduled processes include one of processes 0, 1, 2, and 3; processes 1, 2, 3, and 4; processes 2, 3, 4, and 5; processes 3, 4, 5, and 6; processes 4, 5, 6, and 7; processes 5, 6, 7, and 8; or processes 6, 7, 8, and 9. Hybrid transmission of 4 processes may be indicated in the preceding manner. The offset essentially represents process-overlappable grouping. The indication field of the offset is equivalent to the group serial number field.

In the case where a maximum of 16 processes are supported and a maximum number of 4 TBs scheduled through one PDCCH is supported, it is feasible to divide the 16 processes into four groups: 4+4+4+4. That is, each group contains 4 processes. Hybrid transmission of 4 TBs is indicated in the preceding manner.

Example Three

This example is applicable to an 8-TB scheduling and non-hybrid transmission scenario in the case of multi-TB scheduling enhancement. The purpose is to reduce the signaling overheads, implement multi-TB scheduling, improve the transmission efficiency, and reduce the overheads. The feature is that in the case of multi-TB scheduling, a newly transmitted TB and a retransmitted TB cannot be transmitted in a hybrid manner, 8 TBs correspond to 8 processes, and the feedback mode is multi-bit feedback.

According to this feature, the multi-bit feedback may be 8-bit feedback information that represents information about transmission of the 8 TBs corresponding to the 8 processes.

Since new transmission information is separate from retransmission information, indication by the NDI field and indication by the process field are performed separately. For example, 1-bit or multi-bit NDI indicates information about transmission of all processes.

A process scheduling method is provided for transmission of 8-process 8-TB scheduling. In addition to single TB scheduled by a single process, an even number of TBs are scheduled in other processes. The details are described below.

TABLE 3-1

8-process scheduling under the constraint of a specific number

| Number of Scheduled TBs | Process State |
| --- | --- |
| 8 TBs | Processes 0, 1, 2, 3, 4, 5, 6, and 7 |
| 6 TBs | Processes 0, 1, 2, 3, 4, and 5 (or any 6 processes selected from the 8 processes) |
| 4 TBs | Processes 0, 1, 2, and 3 |
|  | Processes 4, 5, 6, and 7 |
| 2 TBs | Processes 0 and 1 |
|  | Processes 2 and 3 |
|  | Processes 4 and 5 |
|  | Processes 6 and 7 |
| 1 TB | Process 0 |
|  | Process 1 |
|  | Process 2 |
|  | Process 3 |
|  | Process 4 |
|  | Process 5 |
|  | Process 6 |
|  | Process 7 |

That is, the number of TBs is an element in the set {1, 2, 4, 6, 8}. For transmission of a single process, one-time scheduling is required. For transmission of 2 processes, a maximum of two-time scheduling is required. For transmission of 3 processes, a maximum of three-time scheduling is required and a minimum of two-time scheduling is required. For transmission of 4 processes, 5 processes, 6 processes, and 7 processes, a maximum of four-time scheduling is required, while a minimum of one-time scheduling, a minimum of two-time scheduling, a minimum of one-time scheduling, and a minimum of two-time scheduling are required respectively. The preceding table lists a total of 16 states that need to be indicated by a 4-bit process field. Apparently, 6 TBs may be scheduled in any 6 processes. 4 TBs or 2 TBs may have non-overlapping combinations. For example, processes of 4-TB may be processes 0, 1, 3, and 4, and processes 2, 5, 6, and 7.

Embodiments of the present disclosure further provide another constraint method. In this method, the scheduled TB number sequence satisfies the Fibonacci Sequence variation rule. That is, the number of TBs is an element in the set {1, 2, 3, 5, 8}. One process state allocation scheme is as shown in Table 3-2.

TABLE 3-2

8-process scheduling under the constraint of Fibonacci Sequence

| Number of Scheduled TBs | Process State |
| --- | --- |
| 8 TBs | Processes 0, 1, 2, 3, 4, 5, 6, and 7 |
| 5 TBs | Processes 0, 1, 2, 3, and 4 |
|  | Processes 1, 2, 3, 4, and 5 |
|  | Processes 2, 3, 4, 5, and 6 |
|  | Processes 3, 4, 5, 6, and 7 |

TABLE 3-2-continued 8-process scheduling under the constraint of Fibonacci Sequence

| Number of Scheduled TBs | Process State |
| --- | --- |
| 3 TBs | Processes 0, 1, and 2 |
|  | Processes 1, 2, and 3 |
|  | Processes 2, 3, and 4 |
|  | Processes 3, 4, and 5 |
|  | Processes 4, 5, and 6 |
|  | Processes 5, 6, and 7 |
| 2 TBs | Processes 0 and 1 |
|  | Processes 1 and 2 |
|  | Processes 2 and 3 |
|  | Processes 3 and 4 |
|  | Processes 4 and 5 |
|  | Processes 5 and 6 |
|  | Processes 6 and 7 |
| 1 TB | Process 0 |
|  | Process 1 |
|  | Process 2 |
|  | Process 3 |
|  | Process 4 |
|  | Process 5 |
|  | Process 6 |
|  | Process 7 |

The preceding table lists a total of 26 states that can be indicated using only 5 bits. The advantage of the preceding scheme is that any number of processes may be implemented by a minimum of two-time scheduling only. In the case of using 5 bits, any 6 states may still be added.

In the case where a maximum of 10 processes are supported and a maximum of 8 TBs scheduled through one PDCCH is supported, it is feasible to divide the 10 processes into two groups: 8+2. That is, one group contains 8 processes, and the other group contains the remaining 2 processes. Alternatively, the form of 8 processes+offset is used. The offset is indicated using 1 bit to 2 bits. Depending on different values of the offset, scheduled processes include one of processes 0, 1, 2, 3, 4, 5, 6, and 7; processes 1, 2, 3, 4, 5, 6, 7, and 8; or processes 2, 3, 4, 5, 6, 7, 8, and 9.

In the case where a maximum of 16 processes are supported and a maximum of 8 TBs scheduled through one PDCCH is supported, it is feasible to divide the 16 processes into two groups: 8+8. That is, each group contains 8 processes. Alternatively, the form of 8 processes+offset is used. The offset is indicated using 3 bits to 4 bits. The offset essentially represents process-overlappable grouping. The indication field of the offset is equivalent to the group serial number field.

In this example, based on the multi-bit feedback mode, a non-hybrid transmission indication method is provided for 8-process scheduling using 4 bits or 5 bits.

Example Four

This example is applicable to an 8-TB scheduling and hybrid transmission scenario in the case of multi-TB scheduling enhancement. The purpose is to reduce the signaling overheads, implement multi-TB scheduling, improve the transmission efficiency, and reduce the overheads. The feature is that in the case of multi-TB scheduling, a newly transmitted TB and a retransmitted TB can be transmitted in a hybrid manner, and multi-TB scheduling is based on a multi-bit feedback mechanism.

Since the number of 8-bit hybrid transmission states amounts to $3^8-1=6560$, the overhead is excessively large. Hybrid transmission based on 8-TB scheduling may be designed based on the non-hybrid transmission scheme. That is, required specific hybrid transmission states are added. In this manner, not only the basic requirements are satisfied, but the DCI overhead is also reduced.

TABLE 4-1

8-process hybrid transmission scheduling

| Number of TBs | Process Scheduled (NDI = 0 or NDI = 1) | Hybrid Transmission State |
|---|---|---|
| 8 TBs | Processes 0, 1, 2, 3, 4, 5, 6, and 7 | Process 0 (NDI = 0) + process 1 (NDI = 1) |
| | | Process 0 (NDI = 0) + processes 1, 2, and 3 (NDI = 1) |
| 5/4 TBs | Processes 0, 1, 2, and 3 | Process 1 (NDI = 0) + process 0 (NDI = 1) |
| | Processes 4, 5, 6, and 7 | Process 1 (NDI = 0) + processes 0, 2, and 3 (NDI = 1) |
| 2 TBs | Processes 0 and 1 | Process 2 (NDI = 0) + process 3 (NDI = 1) |
| | Processes 2 and 3 | Process 2 (NDI = 0) + processes 0, 1, and 3 (NDI = 1) |
| | Processes 4 and 5 | Process 3 (NDI = 0) + process 2 (NDI = 1) |
| | Processes 6 and 7 | Process 3 (NDI = 0) + processes 0, 1, and 2 (NDI = 1) |
| 1 TB | Process 0 | Process 4 (NDI = 0) + process 5 (NDI = 1) |
| | Process 1 | Process 4 (NDI = 0) + processes 5, 6, and 7 (NDI = 1) |
| | Process 2 | Process 5 (NDI = 0) + process 4 (NDI = 1) |
| | Process 3 | Process 5 (NDI = 0) + processes 4, 6, and 7 (NDI = 1) |
| | Process 4 | Process 6 (NDI = 0) + process 7 (NDI = 1) |
| | Process 5 | Process 6 (NDI = 0) + processes 4, 5, and 7 (NDI = 1) |
| | Process 6 | Process 7 (NDI = 0) + process 6 (NDI = 1) |
| | Process 7 | Process 7 (NDI = 0) + processes 4, 5, and 6 (NDI = 1) |
| | | Processes 0 and 1 (NDI = 0) + processes 2 and 3 (DCI = 1) |
| | | Processes 2 and 3 (NDI = 0) + processes 0 and 1 (DCI = 1) |
| | | Processes 4 and 5 (NDI = 0) + processes 6 and 7 (DCI = 1) |
| | | Processes 6 and 7 (NDI = 0) + processes 4 and 5 (DCI = 1) |
| | | Processes 0, 1, 2, and 3 (NDI = 0) + processes 4, 5, 6, and 7 (NDI = 1) |
| | | Processes 4, 5, 6, and 7 (NDI = 0) + processes 0, 1, 2, and 3 (NDI = 1) |
| 6 TBs | Processes 0, 1, 2, 3, 4, and 5 | Process 0 (NDI = 0) + processes 1, 2, 3, 4, and 5 (NDI = 1) |
| | | Processes 0 and 1 (NDI = 0) + processes 2, 3, 4, and 5 (NDI = 1) |
| | | Process 1 (NDI = 0) + processes 0, 2, 3, 4, and 5 (NDI = 1) |
| | | Processes 2 and 3 (NDI = 0) + processes 0, 1, 4, and 5 (NDI = 1) |
| | | Process 2 (NDI = 0) + processes 0, 1,3,4, and 5 (NDI = 1) |
| | | Processes 4 and 5 (NDI = 0) + processes 0, 1, 2, and 3 (NDI = 1) |
| | | Process 3 (NDI = 0) + processes 0, 1, 2, 4, and 5 (NDI = 1) |
| | | Processes 0, 1, 2, and 3 (NDI = 0) + processes 4 and 5 (NDI = 1) |
| | | Process 4 (NDI = 0) + processes 0, 1, 2, 3, and 5 (NDI = 1) |
| | | Processes 0, 1, 2, 3, 4, and 5 (NDI = 0) + processes 6 and 7 (NDI = 1) |
| | | Process 5 (NDI = 0) + processes 0, 1, 2, 3, and 4 (NDI = 1) |
| | | Processes 6 and 7 (NDI = 0) + processes 0, 1, 2, 3, 4, and 5 (NDI = 1) |

In this case, except the 6-TB scheduling, the preceding table lists a total of 30+22=42 states that need to be indicated using 6 bits. Apparently, in the case where 6 bits are used for indication, there are 22 remaining states, which can be added for the purpose of increasing the flexibility. For example, see the states in Table 3-1, the 6-TB scheduling is performed. In this case, one new transmission state, one retransmission state, and 12 hybrid transmission states are added. Thus, there are a total of 58 states, and another six states can be used.

Based on Table 3-2, another hybrid transmission scheme as described in Table 4-2 is provided.

TABLE 4-2

8-process hybrid transmission scheduling under the constraint of Fibonacci Sequence

| Number of TBs | Process Scheduled (NDI = 0 or NDI = 1) | Hybrid Transmission State |
|---|---|---|
| 8 TBs | Processes 0, 1, 2, 3, 4, 5, 6, and 7 | Process 0 (NDI = 0) + process 1 (NDI = 1) |
| | | Process 1 (NDI = 0) + process 0 (NDI = 1) |

TABLE 4-2-continued 8-process hybrid transmission scheduling under the constraint of Fibonacci Sequence

| Number of Scheduled TBs | Process State (NDI = 0 or NDI = 1) | Hybrid Transmission State |
|---|---|---|
| 5 TBs | Processes 0, 1, 2, 3, and 4; Processes 1, 2, 3, 4, and 5; Processes 2, 3, 4, 5, and 6; Processes 3, 4, 5, 6, and 7 | Process 1 (NDI = 0) + process 2 (NDI = 1)<br>Process 2 (NDI = 0) + process 1 (NDI = 1)<br>Process 2 (NDI = 0) + process 3 (NDI = 1)<br>Process 3 (NDI = 0) + process 2 (NDI = 1)<br>Process 3 (NDI = 0) + process 4 (NDI = 1)<br>Process 4 (NDI = 0) + process 3 (NDI = 1)<br>Process 4 (NDI = 0) + process 5 (NDI = 1)<br>Process 5 (NDI = 0) + process 4 (NDI = 1) |
| 3 TBs | Processes 0, 1, and 2; Processes 1, 2, and 3; Processes 2, 3, and 4; Processes 3, 4, and 5; Processes 4, 5, and 6; Processes 5, 6, and 7 | Process 5 (NDI = 0) + process 6 (NDI = 1)<br>Process 6 (NDI = 0) + process 5 (NDI = 1)<br>Process 6 (NDI = 0) + process 7 (NDI = 1)<br>Process 7 (NDI = 0) + process 6 (NDI = 1)<br>Process 0 (NDI = 0) + processes 1 and 2 (NDI = 1)<br>Process 1 (NDI = 0) + processes 0 and 2 (NDI = 1)<br>Process 1 (NDI = 0) + processes 1 and 3 (NDI = 1)<br>Process 2 (NDI = 0) + processes 0 and 1 (NDI = 1)<br>Process 2 (NDI = 0) + processes 1 and 3 (NDI = 1) |
| 2 TBs | Processes 0 and 1; Processes 1 and 2; Processes 2 and 3; Processes 3 and 4; Processes 4 and 5; Processes 5 and 6; Processes 6 and 7 | Process 2 (NDI = 0) + processes 3 and 4 (NDI = 1)<br>Process 3 (NDI = 0) + processes 1 and 2 (NDI = 1)<br>Process 3 (NDI = 0) + processes 2 and 4 (NDI = 1)<br>Process 3 (NDI = 0) + processes 4 and 5 (NDI = 1)<br>Process 4 (NDI = 0) + processes 2 and 3 (NDI = 1)<br>Process 4 (NDI = 0) + processes 3 and 5 (NDI = 1)<br>Process 4 (NDI = 0) + processes 5 and 6 (NDI = 1)<br>Process 5 (NDI = 0) + processes 3 and 4 (NDI = 1)<br>Process 5 (NDI = 0) + processes 4 and 6 (NDI = 1)<br>Process 5 (NDI = 0) + processes 6 and 7 (NDI = 1) |
| 1 TBs | Process 0; Process 1; Process 2; Process 3; Process 4; Process 5; Process 6; Process 7 | Process 6 (NDI = 0) + processes 4 and 5 (NDI = 1)<br>Process 6 (NDI = 0) + processes 5 and 7 (NDI = 1)<br>Process 7 (NDI = 0) + processes 5 and 6 (NDI = 1)<br>Processes 0, 1, 2, 3, and 4 =<br>0 + 1, 2, 3, and 4 = 1 + 0, 2, 3, and 4 = 2 + 0, 1, 3, and 4 =<br>3 + 0, 1, 2, and 4 = 4 + 0, 1, 2, and 3<br>Processes 2, 3, 4, 5, and 6<br>2 + 3, 4, 5, and 6 = 3 + 2, 4, 5, and 6 = 4 + 2, 3, 5, and 6 =<br>5 + 2, 3, 4, and 6 = 6 + 2, 3, 4, and 5<br>Processes 3, 4, 5, 6, and 7<br>3 + 4, 5, 6, and 7 = 4 + 3, 5, 6, and 7 = 5 + 3, 4, 6, and 7 =<br>6 + 3, 4, 5, and 7 = 7 + 3, 4, 5, and 6<br>Processes 0, 1, 2, 3, 4, 5, 6, and 7 = 0 + 1, 2, 3, 4, 5, 6, and 7 and other 8 similar states<br>The number of 1-TB-based hybrid transmission states is 8 + 12 + 18 + 14 = 52<br>The number of 2-TB-based hybrid transmission states is 12 + 16 + 7 = 35<br>The number of 3-TB-based hybrid transmission states is 12 + 6 = 18<br>The number of 5-TB-based hybrid transmission states is 4 |

Table 4-2 lists a total of 26+52+35+18+4=135 states. These states need to be indicated using 8 bits. These states minus 7 states need to be indicated using only 7 bits.

In the case where a maximum of 10 processes are supported and hybrid transmission of a maximum of 8 TBs scheduled through one PDCCH is supported, it is feasible to divide the 10 processes into two groups: 8+2. That is, one group contains 8 processes, and the other group contains the remaining 2 processes. Hybrid transmission of 8 processes is indicated in the preceding manner. Hybrid transmission of 2 processes is indicated using 2 bits. Alternatively, the form of 8 processes+offset is used. The offset is indicated using 1 bit to 2 bits. Depending on different values of the offset, scheduled processes include processes 0, 1, 2, 3, 4, 5, 6, and 7; or processes 1, 2, 3, 4, 5, 6, 7, and 8; or processes 2, 3, 4, 5, 6, 7, 8, and 9. Hybrid transmission of 8 processes is indicated in the preceding manner.

In the case where a maximum of 16 processes are supported and a maximum of 8 TBs scheduled through one PDCCH is supported, it is feasible to divide the 16 processes into two groups: 8+8. That is, each group contains 8 processes. Alternatively, the form of 8 processes+offset is used. The offset is indicated using 3 bits to 4 bits. Hybrid transmission of 8 processes is indicated in the preceding manner. The offset essentially represents process-overlappable grouping. The indication field of the offset is equivalent to the group serial number field.

Example Five

This example is applicable to an indication of RVs and transmit power control (TPC) signaling in DCI in hybrid transmission and non-hybrid transmission scenarios in the case of multi-TB scheduling enhancement.

According to the preceding feature, RVs in the case of non-hybrid transmission are different from RVs in the case of hybrid transmission. In the case of non-hybrid transmission, all TBs are transmitted the same times and thus may use the same RV. However, in the case of hybrid transmission, TBs are transmitted in different manners and thus correspond to different RVs. Therefore, in the case of non-hybrid transmission, the indicated TBs have the same RV that is determined according to the RV indication signaling in the DCI; and in the case of hybrid transmission, the RV of the first transmitted TB is fixed to 0, and the RV of a retransmitted TB is determined according to the RV indication signaling in the DCI.

For NB-IoT, DCI format N0 for uplink transmission has a 1-bit RV indication signaling field. In the case of non-hybrid transmission, TBs may be scheduled by jointly using the 1-bit RV signaling field. In the case of hybrid transmission, among TBs corresponding to 2 processes, one may be newly transmitted and the other may be retransmitted, so the RV of the newly transmitted TB is fixed to the version 0, that is, RV0, and the RV of the retransmitted TB is still indicated by the signaling field.

For MTC coverage enhancement (CE) mode B, there is no RV indication, and both the newly transmitted TB and the retransmitted TB use the same RV. For MTC CE mode A, the RV signaling field occupies 2 bits, and a total of 4 RVs, that is, RV0, RV1, RV2, and RV3 need to be indicated. In the case of non-hybrid transmission, all TBs may be indicated by jointly using the RV indication. In the case of hybrid transmission, TBs include newly transmitted TBs and retransmitted TBs. The redundancy version of a newly transmitted TB is RV0 by default, and the redundancy version of a retransmitted TB is indicated using 2 bits.

For the TPC signaling, the original indication method may be used. That is, no matter based on the accumulated-value power control method or the absolute-value power control method, the TPC signaling performs power control indication on all scheduled TBs. The original method is to perform the power control indication on a single TB.

In this example, redundancy version indication methods are provided for both a non-hybrid transmission scenario and a hybrid transmission scenario in the case of multi-TB scheduling.

Example Six

This example is applicable to determination of uplink feedback resources in the case of multi-TB scheduling enhancement.

In the case of TB-specific feedback, frequency domain positions of uplink resources for transmitting ACK/NACK corresponding to multiple TBs scheduled through DCI are the same. The TB-specific feedback means that each TB has individual 1-bit feedback information.

In the case of TB-specific feedback and a half-duplex terminal, the uplink resources for transmitting the ACK/NACK corresponding to the multiple TBs scheduled through the DCI are located on continuous valid uplink subframes in time domain.

Figure 4:
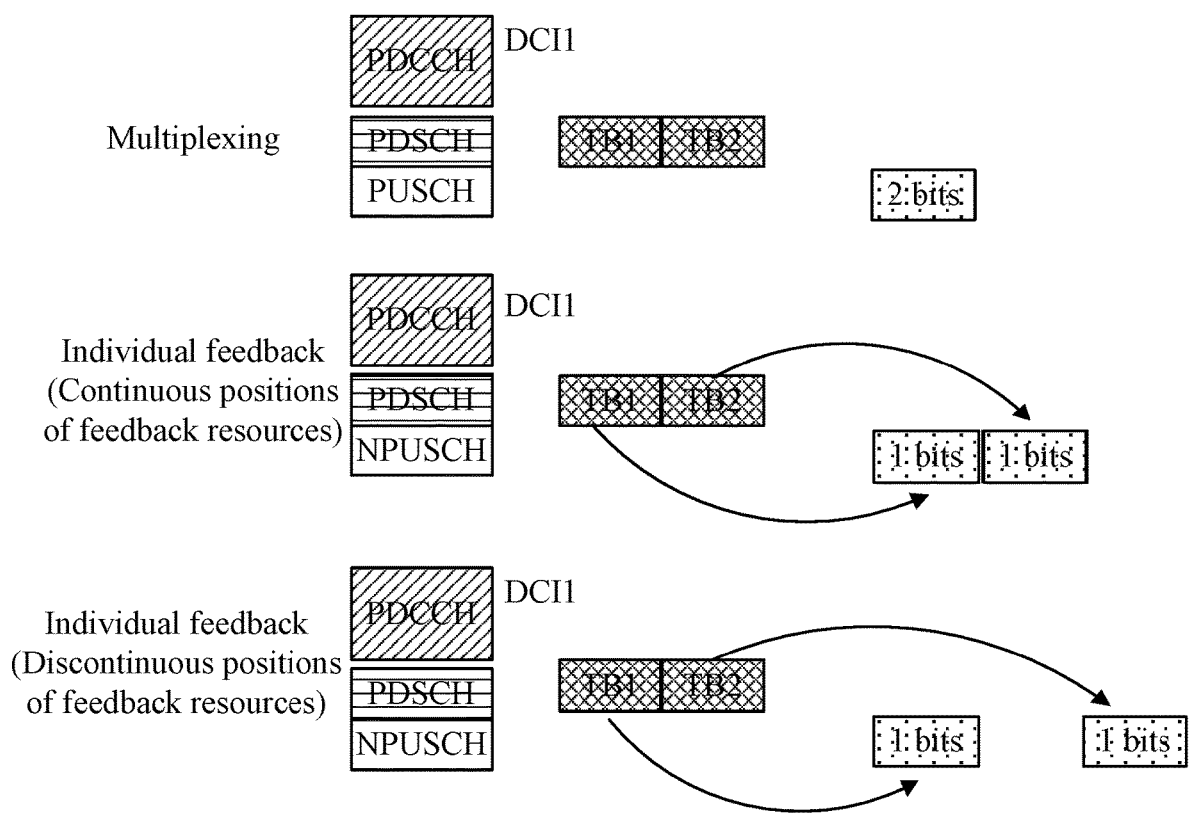
FIG. 4 is a schematic diagram of different feedback scenarios according to embodiments of the present disclosure.

FIG. 4 is a schematic diagram of different feedback scenarios according to embodiments of the present disclosure. As shown in FIG. 4, in the case of multiplexing feedback, in the MTC scenario, the frequency domain positions of the uplink resources for transmitting the ACK/NACK corresponding to the multiple TBs scheduled through the DCI are determined according to higher-layer configuration signaling and an offset (ARO). The multiplexing feedback means that each TB has 1-bit feedback information, and feedback information of the multiple TBs is sent in one uplink physical uplink control channel (PUCCH) resource. The ARO is obtained from an HARQ-ACK resource offset. The HARQ-ACK resource offset is a signaling field of the DCI. In the NB-IoT scenario, time domain positions of multiplexing feedback resources are determined by the DCI indication and an end TB position in multi-TB scheduling.

This example describes the determination of uplink resources in the case of multi-TB scheduling.

Example Seven

This example is applicable to determination of subframe positions for aperiodic CSI reporting in the case of multi-TB scheduling enhancement and the aperiodic CSI reporting triggered by DCI.

If aperiodic CSI is reported through a physical uplink shared channel (PUSCH) in the original manner, CSI resources occupy TB resources. As a result, actual TB transmission resources are reduced. In the case of multi-TB scheduling, positions of aperiodic CSI resources, the size of the aperiodic CSI resources, or the size of TBs transmitted together with the aperiodic CSI resources is determined in one of the four manners below.

(1) The aperiodic CSI resources are transmitted on the first newly transmitted or retransmitted TB. In the case of non-hybrid transmission, the CSI resources may be transmitted on the first newly transmitted TB. Alternatively, in the case of hybrid transmission, the CSI resources may be transmitted on the first retransmitted TB.

(2) The size of the TBs transmitted together with the aperiodic CSI resources is smaller than the size of other TBs in the case of multi-TB scheduling.

The DCI indicates the transport block size (TBS) of other TBs. The TBS including the CSI resources is determined according to the TBS indicated by the DCI and an offset. The offset is a predefined value, is indicated by signaling, is determined according to the resource size, is determined according to the TB transmission code rate, or is determined according to a modulation and coding scheme (MCS) indicated by the DCI.

(3) The CSI resources are transmitted on individual resources.

For example, in the case of multi-TB scheduling, CSI resources need to be transmitted. In this case, corresponding resources are allocated for the CSI and placed in the first transmission resource position. The DCI indicates information related to multi-TB scheduling. The size and positions of the CSI resources may be determined by default or according to the offset and the resource positions indicated by the DCI. The offset is a predefined value, is indicated by signaling, is determined according to the resource size, is determined according to the TB transmission code rate, or is determined according to the MCS indicated by the DCI.

(4) Resources corresponding to the TBs transmitted together with the aperiodic CSI resources are greater in size than resources corresponding to other TBs in the case of multi-TB scheduling.

The DCI indicates resource positions of the other TBs. The TBS including the CSI resources is determined according to the resource positions indicated by the DCI and an offset. The offset is a predefined value, is indicated by signaling, is determined according to the TB size, is determined according to the TB transmission code rate, or is determined according to the MCS indicated by the DCI.

From the description of the preceding implementations, it will be apparent to those skilled in the art that the method according to each preceding embodiment may be implemented by software plus a necessary general-purpose hardware platform or may, of course, be implemented by hardware. However, in many cases, the former is a preferred implementation. Based on this understanding, the solution provided in the present disclosure substantially, or the part contributing to the existing art, may be embodied in the form of a software product. The software product is stored in a storage medium (such as a read only memory (ROM)/random access memory (RAM), a magnetic disk or an optical disk) and includes several instructions for enabling a terminal (which may be a mobile phone, a computer, a server or a network device) to perform the method according to each embodiment of the present disclosure.

Embodiments of the present disclosure further provide an apparatus for transmitting downlink control information. The apparatus is used for implementing the method for transmitting downlink control information according to each preceding embodiment of the present disclosure. What has been described will not be repeated. As used below, the term "module" may be software, hardware or a combination thereof capable of implementing predetermined functions. The apparatuses in the embodiments below are preferably implemented by software, but implementation by hardware or by a combination of software and hardware is also possible and conceived.

Figure 5:
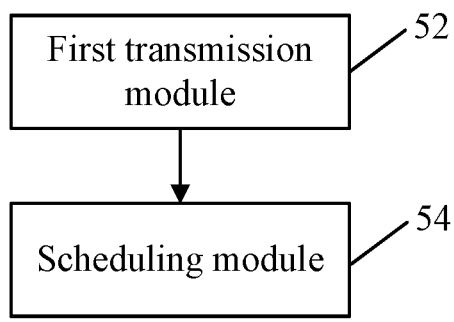
FIG. 5 is a schematic diagram illustrating the structure of an apparatus for transmitting downlink control information according to embodiments of the present disclosure.

FIG. 5 is a schematic diagram illustrating the structure of an apparatus for transmitting downlink control information according to embodiments of the present disclosure. As shown in FIG. 5, the apparatus may include a first transmission module 52 configured to transmit the downlink control information (DCI) through a physical downlink control channel (PDCCH); and a scheduling module 54 configured to schedule multiple transport blocks (TBs) through the DCI. The scheduled multiple TBs are indicated by hybrid automatic repeat request (HARQ) process information and new data indicator (NDI) information in the DCI.

According to embodiments of the present disclosure, the maximum number of the multiple TBs is less than or equal to the maximum supported number of HARQ processes for scheduling.

According to embodiments of the present disclosure, the apparatus may further include a first indication module configured to, in the case where the maximum number of the multiple TBs is 4 and the maximum supported number of HARQ processes for scheduling is 4, indicate the NDI information through a first signaling field and indicate process scheduling information of an HARQ process field through a second signaling field.

According to embodiments of the present disclosure, the first signaling field occupies 1 bit, and the second signaling field occupies 1 bit; alternatively, the first signaling field occupies 1 bit, and the second signaling field occupies 2 bits; alternatively, the first signaling field occupies 1 bit, and the second signaling field occupies 3 bits; alternatively, the first signaling field occupies 1 bit, and the second signaling field occupies 4 bits.

According to embodiments of the present disclosure, process states of the HARQ process field include X states of 1 process, Y states of 2 processes, Z states of 3 processes, and M states of 4 processes. X, Y, Z, and M are natural numbers.

According to embodiments of the present disclosure, in the case where the second signaling field occupies 1 bit, the supported number of the HARQ processes for scheduling includes 1 and 4, and $X+M=2$; or in the case where the second signaling field occupies 2 bits, $X+Y+Z+M\leq4$; alternatively, in the case where the second signaling field occupies 3 bits, $X+Y+Z+M\leq8$; alternatively, in the case where the second signaling field occupies 4 bits, $X+Y+Z+M\leq16$.

According to embodiments of the present disclosure, in the case where the second signaling field occupies 1 bit, $X=1$, and $M=1$; alternatively, in the case where the second signaling field occupies 2 bits, $X+Y+Z+M\leq4$, $X\geq1$, and $M=1$; alternatively, in the case where the second signaling field occupies 3 bits, $X+Y+Z+M\leq8$, $X\geq1$, and $M=1$; alternatively, in the case where the second signaling field occupies 4 bits, $X+Y+Z+M\leq16$, $X\geq1$, and $M=1$.

According to embodiments of the present disclosure, in the case where the second signaling field occupies 2 bits, $X=1, Y=1, Z=1$, and $M=1$; or $X=2, Y=1, Z=0$, and $M=1$; or $X=1, Y=2, Z=0$, and $M=1$.

According to embodiments of the present disclosure, in the case where the second signaling field occupies 3 bits, $X=4, Y=3, Z=0$, and $M=1$; or $X=4, Y=2, Z=1$, and $M=1$; or $X=4, Y=1, Z=2$, and $M=1$; or $X=2, Y=3, Z=2$, and $M=1$.

According to embodiments of the present disclosure, in the case where the second signaling field occupies 4 bits, $X=4, Y=6, Z=4$, and $M=1$.

According to embodiments of the present disclosure, in the case where the second signaling field occupies 1 bit, the process scheduling states of the HARQ process field indicated by the second signaling field include at least one of processes 0, 1, 2, and 3; or process 0.

According to embodiments of the present disclosure, in the case where the second signaling field occupies 2 bits, the process scheduling states of the HARQ process field indicated by the second signaling field include at least one of processes 0, 1, 2, and 3; processes 0, 1, and 2; processes 0 and 1; or process 3. Alternatively, in the case where the second signaling field occupies 2 bits, the process scheduling states of the HARQ process field indicated by the second signaling field include at least one of processes 0, 1, 2, and 3; processes 0 and 1; process 0; or process 1. Alternatively, in the case where the second signaling field occupies 2 bits, the process scheduling states of the HARQ process field indicated by the second signaling field include at least one of processes 0, 1, 2, and 3; processes 0 and 1; processes 2 and 3; or process 0.

According to embodiments of the present disclosure, in the case where the second signaling field occupies 3 bits, the process scheduling states of the HARQ process field indicated by the second signaling field include at least one of processes 0, 1, 2, and 3; processes 0, 1, and 2; processes 1, 2, and 3; processes 0 and 1; processes 1 and 2; processes 2 and 3; process 0; or process 3.

According to embodiments of the present disclosure, in the case where the second signaling field occupies 3 bits, the process scheduling states of the HARQ process field indicated by the second signaling field include at least one of processes 0, 1, 2, and 3; processes 0 and 1; processes 2 and 3; process 0; process 1; process 2; process 3; or processes 0, 1, and 2. Alternatively, in the case where the second signaling field occupies 3 bits, the process scheduling states of the HARQ process field indicated by the second signaling field include at least one of processes 0, 1, 2, and 3; processes 0 and 1; processes 2 and 3; processes 1 and 2; process 0; process 1; process 2; or process 3. Alternatively, in the case where the second signaling field occupies 3 bits, the process scheduling states of the HARQ process field indicated by the second signaling field include at least one of processes 0, 1, 2, and 3; processes 0 and 1; processes 2 and 3; processes 0 and 2; process 0; process 1; process 2; or process 3.

According to embodiments of the present disclosure, the apparatus may further include a second indication module configured to, in the case where the maximum number of the multiple TBs is 4 and the maximum supported number of HARQ processes for scheduling is 4, indicate the NDI information and process scheduling information of an HARQ process field through a third signaling field.

According to embodiments of the present disclosure, the third signaling field occupies 5 bits, 6 bits, or 7 bits.

According to embodiments of the present disclosure, the process states of the HARQ process field include X states of 1 process, Y states of 2 processes, Z states of 3 processes, and M states of 4 processes.

According to embodiments of the present disclosure, in the case where the third signaling field occupies 5 bits, $X+Y+Z+M \leq 32$; or in the case where the third signaling field occupies 6 bits, $X+Y+Z+M \leq 64$; or in the case where the third signaling field occupies 7 bits, $X+Y+Z+M \leq 128$.

According to embodiments of the present disclosure, in the case where the third signaling field occupies 5 bits, $X=8$, and $Y+Z+M \leq 24$; or $X=4$, and $Y+Z+M \leq 28$; or $X=1$, and $Y+Z+M \leq 31$.

According to embodiments of the present disclosure, in the case where the third signaling field occupies 6 bits, $X=8$, and $Y+Z+M \leq 56$.

According to embodiments of the present disclosure, in the case where the third signaling field occupies 7 bits, $X+Y+Z+M=80$, where $X=8$, $Y=24$, $Z=32$, and $M=16$.

According to embodiments of the present disclosure, in the case where the third signaling field occupies 5 bits, the process scheduling states of the HARQ process field indicated by the third signaling field include at least one of processes 0, 1, 2, and 3, and NDI=0 or 1; processes 0 and 1, and NDI=0 or 1; processes 2 and 3, and NDI=0 or 1; process 0, and NDI=0 or 1; process 1, and NDI=0 or 1; process 2, and NDI=0 or 1; process 3, and NDI=0 or 1; process 0, and NDI=0+process 1, and NDI=1; process 0, and NDI=0+processes 1, 2, and 3, and NDI=1; process 1, and NDI=0+process 0, and NDI=1; process 1, and NDI=0+processes 0, 2, and 3, and NDI=1; process 2, and NDI=0+process 3, and NDI=1; process 2, and NDI=0+processes 0, 1, and 3, and NDI=1; process 3, and NDI=0+process 2, and NDI=1; process 3, and NDI=0+processes 0, 1, and 2, and NDI=1; processes 0 and 1, and NDI=0+processes 2 and 3, and NDI=1; or processes 2 and 3, and NDI=0+processes 0 and 1, and NDI=1.

According to embodiments of the present disclosure, the apparatus may further include a third indication module configured to, in the case where the maximum number of the multiple TBs is 8 and the maximum supported number of HARQ processes for scheduling is 8, indicate the NDI information through a fourth signaling field and indicate process scheduling information of an HARQ process field through a fifth signaling field.

According to embodiments of the present disclosure, the supported number of the HARQ processes for scheduling includes 1, 2, 3, 4, 6, and 8; or 1, 2, 4, 6, and 8; or 1, 4, and 8; or 1, 2, 3, 4, and 8; or 1, 2, 4, and 8; or 1, 2, 4, 7, and 8.

According to embodiments of the present disclosure, the fourth signaling field occupies 1 bit, and the fifth signaling field occupies 3 bits; or the fourth signaling field occupies 1 bit, and the fifth signaling field occupies 4 bits; or the fourth signaling field occupies 1 bit, and the fifth signaling field occupies 5 bits.

According to embodiments of the present disclosure, process states of the HARQ process field include X states of 1 process, Y states of 2 processes, Z states of 3 processes, M states of 4 processes, N states of 5 processes, P states of 6 processes, Q states of 7 processes, and R states of 8 processes, where X, Y, Z, M, N, P, Q, and R are natural numbers.

According to embodiments of the present disclosure, in the case where the fifth signaling field occupies 3 bits, $R=1$, and $X+Y+Z+M+N+P+Q+R \leq 8$; or in the case where the fifth signaling field occupies 4 bits, $R=1$, and $X+Y+Z+M+N+P+Q+R \leq 16$; or in the case where the fifth signaling field occupies 5 bits, $R=1$, and $X+Y+Z+M+N+P+Q+R \leq 32$.

According to embodiments of the present disclosure, in the case where the fifth signaling field occupies 3 bits, $X=1$, $Y=1$, $Z=1$, $M=1$, $N=1$, $P=1$, $Q=1$, and $R=1$; or $X=4$, $Y=2$, $R=1$, and $0 \leq Z+M+N+P+Q \leq 1$; or $X=1$, $Y=2$, $Z=0$, $M=2$, $N=0$, $P=2$, $Q=0$, and $R=1$; or $X=1$, $Y=2$, $Z=2$, $M=2$, $N=0$, $P=0$, $Q=0$, and $R=1$; or $X=1$, $Y=2$, $Z=2$, $M=2$, $N=0$, $P=0$, $Q=0$, and $R=1$; or $X=1$, $Y=0$, $Z=2$, $M=2$, $N=2$, $P=0$, $Q=0$, and $R=1$; or $X=1$, $Y=2$, $Z=0$, $M=2$, $N=2$, $P=0$, $Q=0$, and $R=1$.

According to embodiments of the present disclosure, in the case where the fifth signaling field occupies 4 bits, $X=8$, $R=1$, and $Y+Z+M+P+N+Q \leq 7$; or $X=8$, $Y=4$, $M=2$, $R=1$, and $0 \leq Z+P+N+Q \leq 1$; or $X=4$, $R=1$, and $Y+Z+M+P+N+Q \leq 11$; or $X=4$, $Y=4$, $M=2$, $R=1$, and $0 \leq Z+N+P+Q \leq 5$.

According to embodiments of the present disclosure, in the case where the fifth signaling field occupies 5 bits, $X+Y+Z+M+N+P+Q+R \leq 32$; and $X=8$, and $R=1$; or $X=4$, and $R=1$; or $X=2$, and $R=1$.

According to embodiments of the present disclosure, in the case where the fifth signaling field occupies 4 bits, the case where $Y+Z+M+P+N+Q \leq 7$, $R=1$, and $X=8$ includes at least one of $Y=4$, $M=2$, and $Z=1$; $Y=4$, $M=2$, and $N=1$; $Y=4$, $M=2$, and $P=1$; or $Y=4$, $M=2$, and $Q=1$. Alternatively, in the case where the fifth signaling field occupies 4 bits, the case where $Y+Z+M+P+N+Q \leq 11$, $R=1$, and $X=4$ includes at least one of $Y=4$, $M=2$, $Z=2$, $P=1$, $Q=1$, and $N=1$; or $Y=3$, $M=2$, $Z=3$, $P=1$, $Q=1$, and $N=1$.

According to embodiments of the present disclosure, in the case where the fifth signaling field occupies 5 bits, the case where $X=8$, $R=1$, and $Y+Z+M+N+P+Q \leq 23$ includes at least one of $Q=2$, $P=3$, $N=4$, $M=4$, $Y=5$, and $Z=5$, $Q=2$, $P=3$, $N=4$, $M=4$, $Y=6$, and $Z=4$; or $Q=2$, $P=2$, $N=2$, $M=4$, $Y=7$, and $Z=6$. Alternatively, in the case where the fifth signaling field occupies 5 bits, and in the case where $X=4$, $R=1$, and $Y+Z+M+N+P+Q \leq 27$, $Q=2$, $P=3$, $N=4$, $M=5$, $Y=7$, and $Z=6$. Alternatively, in the case where the fifth signaling field occupies 5 bits, the case where $X=2$, $R=1$, and $Y+Z+M+N+P+Q \leq 29$ includes at least one of $Q=2$, $P=3$, $N=4$, $M=5$, $Y=9$, and $Z=6$, $Q=2$, $P=3$, $N=4$, $M=5$, $Y=8$, and $Z=7$; $Q=2$, $P=3$, $N=4$, $M=5$, $Y=7$, and $Z=8$, or $Q=2$, $P=3$, $N=4$, $M=7$, $Y=7$, and $Z=6$.

According to embodiments of the present disclosure, in the case where the fifth signaling field occupies 4 bits, the process scheduling states of the HARQ process field indicated by the fifth signaling field include at least one of processes 0, 1, 2, 3, 4, 5, 6, and 7; processes 0, 1, 2, 3, 4, and 5; processes 0, 1, 2, and 3; processes 4, 5, 6, and 7; processes 0 and 1; processes 2 and 3; processes 4 and 5; processes 6 and 7; process 0; process 1; process 2; process 3; process 4; process 5; process 6; or process 7.

According to embodiments of the present disclosure, in the case where the fifth signaling field occupies 5 bits, the process scheduling states of the HARQ process field indicated by the fifth signaling field include at least one of processes 0, 1, 2, 3, 4, 5, 6, and 7; processes 0, 1, 2, 3, and 4; processes 1, 2, 3, 4, and 5; processes 2, 3, 4, 5, and 6; processes 3, 4, 5, 6, and 7; processes 0, 1, and 2; processes 1, 2, and 3; processes 2, 3, and 4; processes 3, 4, and 5; processes 4, 5, and 6; processes 5, 6, and 7; processes 0 and 1; processes 1 and 2; processes 2 and 3; processes 3 and 4; processes 4 and 5; processes 5 and 6; processes 6 and 7; process 0; process 1; process 2; process 3; process 4; process 5; process 6; or process 7.

According to embodiments of the present disclosure, in the case where the maximum number of the multiple TBs is 4 and the maximum supported number of HARQ processes for scheduling is 4, the number of processes supporting hybrid transmission includes at least 2 processes and 4 processes; or includes at least 2 processes and 3 processes; or includes at least 2 processes.

According to embodiments of the present disclosure, in the case where the maximum number of the multiple TBs is 8 and the maximum supported number of HARQ processes for scheduling is 8, the number of processes supporting hybrid transmission includes at least 2 processes, 4 processes, and 8 processes; or includes at least 2 processes, 3 processes, and 4 processes; or includes at least 2 processes and 4 processes; or includes at least 2 processes and 3 processes; or includes at least 2 processes.

According to embodiments of the present disclosure, the apparatus may further include a fourth indication module configured to, in the case where the maximum number of TBs scheduled by one piece of DCI is 8 and the maximum supported number of HARQ processes for scheduling is 8, indicate the NDI information and process scheduling information of an HARQ process field through a sixth signaling field.

According to embodiments of the present disclosure, the sixth signaling field occupies 5 bits, 6 bits, or 7 bits.

According to embodiments of the present disclosure, the apparatus may further include a fifth indication module configured to, in the case where the maximum number of the multiple TBs is less than the maximum supported number of the HARQ processes for scheduling, indicate, through a configured number of HARQ processes and an offset indication field, the scheduling of the HARQ processes. The number of HARQ processes are configured in at least one of the following manners: predefined, obtained from a process set configured by a base station, configured through higher-layer signaling, or configured through an HARQ process field in the DCI; and the offset indication field is configured to indicate an offset based on the configured number of HARQ processes.

According to embodiments of the present disclosure, in the case where one TB is fed back through one bit, and one bit corresponds to one uplink resource, frequency domain positions of uplink resources for transmitting ACK/NACK corresponding to the multiple TBs scheduled through the DCI are the same; alternatively, in the case where the multiple TBs are fed back through multiple bits, and the multiple bits are fed back on one uplink resource, the frequency domain positions of the uplink resources for transmitting the ACK/NACK corresponding to the multiple TBs scheduled through the DCI are determined according to higher-layer configuration signaling and an offset ARO; alternatively, in the case where one TB is fed back through one bit, and a half-duplex terminal is used, the uplink resources for transmitting the ACK/NACK corresponding to the multiple TBs scheduled through the DCI are located on continuous valid uplink subframes in time domain.

According to embodiments of the present disclosure, the apparatus may further include a determination module configured to, in the case where the DCI triggers aperiodic channel state information (CSI) reporting, determine positions of aperiodic CSI resources, a size of aperiodic CSI resources, or a size of TBs transmitted together with aperiodic CSI resources in one of the following manners: in the case of non-hybrid transmission, the aperiodic CSI resources are transmitted on the first newly transmitted TB; in the case of hybrid transmission, the aperiodic CSI resources are transmitted on the first retransmitted TB; the aperiodic CSI resources are transmitted on individual resources; the size of the TBs transmitted together with the aperiodic CSI resources is smaller than the size of other TBs except the TBs transmitted together with the aperiodic CSI resources, where the other TBs are among the multiple TBs scheduled through the DCI; resources corresponding to the TBs transmitted together with the aperiodic CSI resources are greater in size than resources corresponding to the other TBs except the TBs transmitted together with the aperiodic CSI resources, where the other TBs are among the multiple TBs scheduled through the DCI.

Figure 6:
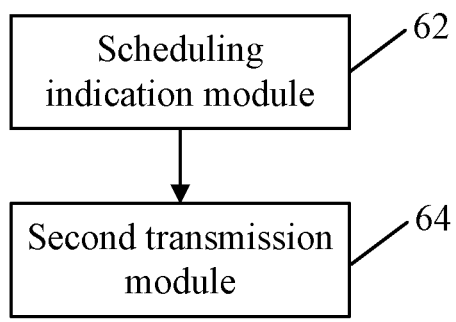
FIG. 6 is a schematic diagram illustrating the structure of another apparatus for transmitting downlink control information according to embodiments of the present disclosure.

Embodiments of the present disclosure further provide an apparatus for transmitting downlink control information. FIG. 6 is a schematic diagram illustrating the structure of another apparatus for transmitting downlink control information according to embodiments of the present disclosure. As shown in FIG. 6, the apparatus may include a scheduling indication module 62 configured to, in the case where multiple transport blocks (TBs) are scheduled through one piece of downlink control information (DCI), indicate redundancy versions (RVs) of the scheduled multiple TBs through an RV signaling field in the DCI or set the RVs of the multiple TBs to fixed values; and a second transmission module 64 configured to transmit the DCI through a physical downlink control channel (PDCCH).

According to embodiments of the present disclosure, in the case where the multiple TBs include a newly transmitted TB and a retransmitted TB, the RV of the newly transmitted TB is a fixed value, and the RV of the retransmitted TB is indicated by the RV signaling field in the DCI; alternatively, in the case where the multiple TBs include only newly transmitted TBs, the RVs of the multiple TBs are the same, where the RVs are indicated through the RV signaling field in the DCI or are the fixed values; alternatively, in the case where the multiple TBs include only retransmitted TBs, the RVs of the multiple TBs are the same, where the RVs are indicated through the RV signaling field in the DCI.

According to embodiments of the present disclosure, in the case where an RV of a newly transmitted TB is the fixed value, the RV of the newly transmitted TB is RV0, RV1, RV2, or RV3.

According to embodiments of the present disclosure, in the case where one TB is fed back through one bit, and one bit corresponds to one uplink resource, frequency domain positions of uplink resources for transmitting ACK/NACK corresponding to the multiple TBs scheduled through the DCI are the same; alternatively, in the case where the multiple TBs are fed back through multiple bits, and the multiple bits are fed back on one uplink resource, the frequency domain positions of the uplink resources for transmitting the ACK/NACK corresponding to the multiple TBs scheduled through the DCI are determined according to higher-layer configuration signaling and an offset ARO; alternatively, in the case where one TB is fed back through one bit, and a half-duplex terminal is used, the uplink resources for transmitting the ACK/NACK corresponding to the multiple TBs scheduled through the DCI are located on continuous valid uplink subframes in time domain.

It is to be noted that the preceding modules may be implemented by software or hardware. Implementation by hardware may, but not necessarily, be performed in the following manner: The preceding modules are located in the same processor or the preceding modules are located in any combination in their respective processors.

Embodiments of the present disclosure further provide a storage medium. The storage medium stores a computer program configured to, when executed, cause steps in any preceding method embodiment to be performed.

According to embodiments of the present disclosure, in this embodiment, the storage medium may be configured to store a computer program for causing step S11 and step S12 to be performed. In step S11, the downlink control information (DCI) is transmitted through a physical downlink control channel (PDCCH). In step S12, multiple transport blocks (TBs) are scheduled through the DCI. The scheduled multiple TBs are indicated through new data indicator (NDI) information and hybrid automatic repeat request (HARQ) process information in the DCI.

According to embodiments of the present disclosure, in this embodiment, the storage medium may further be configured to store a computer program for causing step S21 and step S22 to be performed. In step S21, in the case where multiple transport blocks (TBs) are scheduled through one piece of downlink control information (DCI), redundancy versions (RVs) of the scheduled multiple TBs are indicated through an RV signaling field in the DCI or the RVs of the multiple TBs are set to fixed values. In step S22, the DCI is transmitted through a physical downlink control channel (PDCCH).

According to embodiments of the present disclosure, in this embodiment, the storage medium may include, but is not limited to, a U disk, a read-only memory (ROM), a random-access memory (RAM), a mobile hard disk, a magnetic disk, an optical disk or another medium capable of storing a computer program.

Embodiments of the present disclosure further provide an electronic apparatus. The electronic apparatus includes a memory and a processor. The memory stores a computer program. The processor is configured to execute the computer program to perform steps in any preceding method embodiment.

According to embodiments of the present disclosure, the electronic apparatus may further include a transmission device and an input and output device. The transmission device is connected to the processor. The input and output device is connected to the processor.

According to embodiments of the present disclosure, in this embodiment, the processor may be configured to perform step S11 and step S12 through the computer program. In step S11, the downlink control information (DCI) is transmitted through a physical downlink control channel (PDCCH). In step S12, multiple transport blocks (TBs) are scheduled through the DCI. The scheduled multiple TBs are indicated through new data indicator (NDI) information and Hybrid automatic repeat request (HARQ) process information in the DCI.

According to embodiments of the present disclosure, in this embodiment, the processor may further be configured to perform step S21 and step S22 through the computer program. In step S21, in the case where multiple transport blocks (TBs) are scheduled through one piece of downlink control information (DCI), redundancy versions (RVs) of the scheduled multiple TBs are indicated through an RV signaling field in the DCI or the RVs of the multiple TBs are set to fixed values. In step S22, the DCI is transmitted through a physical downlink control channel (PDCCH).

According to embodiments of the present disclosure, for examples in this embodiment, reference may be made to the examples described in the preceding embodiments and optional implementations, and the examples are not repeated in this embodiment.

Apparently, it is to be understood by those skilled in the art that the modules or steps of the present disclosure may be implemented by at least one general-purpose computing apparatus and may be concentrated on a single computing apparatus or distributed in a network formed by multiple computing apparatus. According to embodiments of the present disclosure, these modules or steps may be implemented by program codes executable by the at least one computing apparatus. Thus, these modules or steps may be stored in a storage medium and executed by the at least one computing apparatus. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this manner, the present disclosure is not limited to any specific combination of hardware and software.

The preceding are only preferred embodiments of the present disclosure and are not intended to limit the present disclosure. For those skilled in the art, the present disclosure may have various modifications and variations. Any modifications, equivalent substitutions, improvements and the like within the principle of the present disclosure are within the scope of the present disclosure.

What is claimed is:

1. A method for transmitting downlink control information, comprising:
   transmitting, by a base station, the downlink control information (DCI) through a physical downlink control channel (PDCCH); and
   providing, by the base station in the DCI, a joint indication using hybrid automatic repeat request (HARQ) process information and new data indicator (NDI) information so as to schedule multiple transport blocks (TBs), wherein each of the multiple TBs is associated with a corresponding one of uplink resources for transmitting acknowledgment (ACK) or negative acknowledgment (NACK), and the uplink resources have a same frequency domain position determined according to a higher-layer configuration signaling and an offset;
   wherein in response to a maximum number of the multiple TBs scheduled through one PDCCH being 8 and a maximum number of HARQ processes for scheduling being 8 or greater than 8, a number of the HARQ processes for scheduling is one of following numbers: 1, 2, 4, 6, or 8.

2. The method of claim 1, wherein the maximum number of the multiple TBs is less than or equal to the maximum number of HARQ processes for scheduling.

3. The method of claim 1, further comprising:
   indicating, by the base station, the NDI information and the HARQ process information by one of:
   indicating, by the base station, the NDI information and the HARQ process information through a fourth signaling field and a fifth signaling field, respectively, or indicating, by the base station, the NDI information and the HARQ process information through a sixth signaling field.

4. The method of claim 1, further comprising:
in response to determining that the maximum number of HARQ processes is greater than 8 and the maximum number of the multiple TBs scheduled through one PDCCH is 8, dividing the HARQ processes into a first group and a second group,
wherein the first group comprises 8 HARQ processes and the second group comprises the remaining HARQ processes.

5. A communication apparatus, comprising:
a processor; and
a memory configured to store a computer program;
wherein when the computer program is executed, the processor is configured to:
   transmit the downlink control information (DCI) through a physical downlink control channel (PDCCH); and
   provide, in the DCI, a joint indication using hybrid automatic repeat request (HARQ) process information and new data indicator (NDI) information so as to schedule multiple transport blocks (TBs), wherein each of the multiple TBs is associated with a corresponding one of uplink resources for transmitting acknowledgment (ACK) or negative acknowledgment (NACK), and the uplink resources have a same frequency domain position determined according to a higher-layer configuration signaling and an offset;
   wherein in response to a maximum number of the multiple TBs scheduled through one PDCCH being 8 and a maximum number of HARQ processes for scheduling being 8 or greater than 8, a number of the HARQ processes for scheduling is one of following numbers: 1, 2, 4, 6, or 8.

6. The communication apparatus of claim 5, wherein the maximum number of the multiple TBs is less than or equal to the maximum number of HARQ processes for scheduling.

7. The communication apparatus of claim 5, wherein when the computer program is executed, the processor is further configured to:
   indicate the NDI information and the HARQ process information by one of:
      indicating the NDI information and the HARQ process information through a fourth signaling field and a fifth signaling field, respectively, or
      indicating the NDI information and the HARQ process information through a sixth signaling field.

8. The communication apparatus of claim 5, wherein when the computer program is executed, the processor is further configured to:
   in response to determining that the maximum number of HARQ processes is greater than 8 and the maximum number of the multiple TBs scheduled through one PDCCH is 8, divide the HARQ processes into a first group and a second group,
   wherein the first group comprises 8 HARQ processes and the second group comprises the remaining HARQ processes.

* * * * *